United States Patent
Goloubentsev

(12) 
(10) Patent No.: US 11,714,618 B2
(45) Date of Patent: Aug. 1, 2023

(54) STREAMING COMPILER FOR AUTOMATIC ADJOINT DIFFERENTIATION

(71) Applicant: Dmitri Goloubentsev, London (GB)

(72) Inventor: Dmitri Goloubentsev, London (GB)

( * ) Notice: Subject to any disclaimer, the term of this patent is extended or adjusted under 35 U.S.C. 154(b) by 0 days.

(21) Appl. No.: 17/419,971

(22) PCT Filed: Jul. 8, 2020

(86) PCT No.: PCT/EP2020/069307
§ 371 (c)(1),
(2) Date: Jun. 30, 2021

(87) PCT Pub. No.: WO2021/005130
PCT Pub. Date: Jan. 14, 2021

(65) Prior Publication Data
US 2022/0091831 A1   Mar. 24, 2022

(30) Foreign Application Priority Data

Jul. 8, 2019   (EP) .................................... 19185052

(51) Int. Cl.
*G06F 8/41*   (2018.01)
*G06F 17/17*   (2006.01)

(52) U.S. Cl.
CPC .............. *G06F 8/443* (2013.01); *G06F 17/17* (2013.01)

(58) Field of Classification Search
CPC .................................. G06F 8/443; G06F 17/17
See application file for complete search history.

(56) References Cited

U.S. PATENT DOCUMENTS

| | | | |
|---|---|---|---|
| 2004/0146197 A1* | 7/2004 | Piponi ..................... | G06T 15/20 382/154 |
| 2008/0163188 A1* | 7/2008 | Siskind ..................... | G06F 8/60 719/328 |
| 2009/0077543 A1* | 3/2009 | Siskind .................... | G06F 8/447 717/136 |

OTHER PUBLICATIONS

Djeddi et al., "Novel Expression-Template-Based Automatic Differentiation of Fortran Codes for Aerodynamic Optimization" (Year: 2021).*

Gao et al., "Automatic differentiation based discrete adjoint method for aerodynamic design optimization on unstructured meshes" (Year: 2017).*

(Continued)

*Primary Examiner* — Phillip H Nguyen
(74) *Attorney, Agent, or Firm* — Barnes & Thornburg LLP

(57) ABSTRACT

A method for operating on a target function to provide computer code instructions configured to implement automatic adjoint differentiation of the target function. The method comprises: determining, based on the target function, a linearized computational map (100), LCM, of the target function wherein each node of the LCM (100) comprises an elementary operation; for each node of the LCM (100) forming computer code instructions configured to: (i) compute intermediate data associated with a forward function of an automatic adjoint differentiation algorithm; and, (ii) increment, according to the automatic adjoint differentiation algorithm, adjoint variables of the preceding connected nodes of the each node in dependence on intermediate data; wherein forming computer code instructions for both step (i) and step (ii) for each node is performed prior to performing said steps for a subsequent node of the LCM (100).

20 Claims, 14 Drawing Sheets

(56) References Cited

OTHER PUBLICATIONS

Talnikar et al., "A two-level computational graph method for the adjoint of a finite volume based compressible unsteady flow solver" (Year: 2018).*
Merrienboer et al., "Automatic differentiation in ML: Where we are and where we should be going" (Year: 2018).*
Shen et al., "Fast Automatic Differentiation for Large Scale Bundle Adjustment" (Year: 2018).*
Ugolotti et al., "An Adjoint-based Sensitivity Formulation Using the Discontinuous Galerkin Method" (Year: 2019).*
Pierre Vandenhove, "Functional Design of Computation Graph" (Year: 2018).*
Bischof et al., "Implementation of automatic differentiation tools," Partial evaluation and semantics-based program manipulation, ACM, 2 Penn Plaza, Suite 701 New York NY 10121-0701, pp. 98-107 (Jan. 14, 2022).
Dastouri et al., "A Mixed Operator Overloading And Source Transformation Approach For Adjoint CFD Computation," Proceedings of the VII European Congress on Computational Methods in Applied Sciences and Engineering (ECCOMAS Congress 2016), Institute of Structural Analysis and Antiseismic Research School of Civil Engineering National Technical University of Athens (Jun. 5, 2016).
Hascoët, "Automatic Differentiation by Program Transformation," Retrieved from the Internet: URL: https://www-sop.inria.fr/tropics/papers/supportCoursDA.pdf (Apr. 30, 2007).
Search Report & Written Opinion issued in Int'l Appl. No. PCT/EP2020/069307 (dated 2020).
Charoenwanit, "Fully Automatic Adjoints of Large-Scale Numerical Simulations," Dissertation, Jul. 12, 2019, Retrieved from the Internet: http://publications.rwth-aachen.de/record/761689/files/761689.pdf.
Examination Report issued in Appl. No. EP20750173.5 (dated Dec. 20, 2022).
Hogan, "Fast Reverse-Mode Automatic Differentiation using Expression Templates in C++," ACM Transactions On Mathematical Software, ACM, vol. 40, No. 4, pp. 1-6 (Jul. 8, 2014).
Weinstein, "A Source Transformation via Operator Overloading Method for the Automatic Differentiation of Mathematical Functions in MATLAB," ACM Transactions On Mathematical Software, ACM, vol. 42, No. 2, pp. 1-44 (May 24, 2016).

* cited by examiner

STREAMING COMPILER FOR AUTOMATIC ADJOINT DIFFERENTIATION

CROSS-REFERENCE TO RELATED APPLICATIONS

This application is a US National Stage Application under 35 USC § 371 of PCT Application No. PCT/EP2020/069307, filed Jul. 8, 2020, which claimed priority from European Application No. EP 19185052.8, filed Jul. 8, 2019, the entirety of each are hereby fully incorporated by reference herein.

FIELD OF THE INVENTION

The present invention relates to a computer implemented methods for producing computer code for evaluating and finding derivatives of functions and subprograms for modelling or simulating the sensitivity of complex systems, particularly using automatic adjoint differentiation methods.

BACKGROUND

In a wide variety of areas, modelling to predict the behavior of physical systems over time or in response to changing parameters is of fundamental importance, for example, in modelling of weather, ballistics, sensors networks, infrastructure networks, computer networks and other areas where it is desirable to simulate or model the sensitivity of dependent variables to change. Finding solutions to problems such as these often requires computer implemented models or simulations of complex systems which may involve differentiation of complicated mathematical functions which simulate or model the system of interest. These derivatives are often complex to derive by symbolic differentiation and computer implemented numerical techniques suffer from truncation and rounding errors which prevent adequately accurate solutions being obtained; additionally, the execution times of numerical finite difference methods are generally proportional to the number of input variables which may prove costly for functions with large numbers of input variables. Given a function of interest there exists a need for fast, reliable differentiation of that function. Frequently models of systems are described in computer code or programs which can compute output values quickly for large sets or sweeps over large numbers of input values. It is desirable to automatically transform such programs into programs that will also compute their derivatives.

Automatic differentiation (AD) is a set of techniques to algorithmically evaluate the derivative of a function specified by a computer program. Computer programs evaluate functions by executing a sequence of elementary operations; these may comprise processor intrinsic operations; elementary arithmetic operations, e.g. addition, subtraction, multiplication and division; elementary functions such as exp(x), sin(x) and other atomic operations. By applying the chain rule repeatedly to these elementary operations derivatives can be computed automatically.

Existing approaches to AD fall into two main categories: code transformation and operator overloading techniques. Code transformation techniques entail taking the source code of a function and replacing it with statements that calculate the derivatives interleaved with the original instructions. Operator overloading techniques require no change to the form or sequence of the operations in the original code, but require a change to the basic data types to overload the elementary operations to perform augmented arithmetic including, for example, the calculation of partial derivatives.

Code transformation typically demonstrates better performance but cannot be used to process arbitrary functions because of the complexity of high level computer code languages typically used to describe the initial function. Operator overloading is significantly more flexible in this regard but typically harder to optimise at compile time in comparison to code produced by a code transformation technique, resulting in its inferior performance.

STATEMENTS OF INVENTIONS

According to a first aspect of the invention a computer implemented method for operating on a target function to provide computer code instructions configured to implement automatic adjoint differentiation of the target function is provided, the method comprising: determining, based on the target function, a linearized computational map, LCM, of the target function wherein each node of the LCM comprises an elementary operation; for each node of the LCM forming computer code instructions configured to: (i) compute intermediate data associated with a forward function of an automatic adjoint differentiation algorithm; and, (ii) increment, according to the automatic adjoint differentiation algorithm, adjoint variables of the preceding connected nodes of the each node in dependence on intermediate data; wherein forming computer code instructions for both step (i) and step (ii) for each node is performed prior to performing said steps for a subsequent node of the LCM. This allows the forward and reverse functions of an automatic adjoint differentiation algorithm to be formed in parallel. The entire forward function need not be observed before construction of the reverse function.

The target function may thus be expressed as a sequence of nodes, each node being associated with an elementary operation. A variable may thus be associated with each node (the output of this elementary operation). The automatic adjoint differentiation algorithm may comprise computing the derivatives of dependent variables (e.g. outputs) of the target function with respect to the elementary operations associated with each node (e.g. with respect to the variable associated with that node). This may be done recursively, for example by stepping through the sequence of nodes from the dependent variable (the output) to the independent variables (input) of the target function.

The method may be performed at runtime of the target function—e.g. during execution of the target function.

Optionally, the method further comprises hardcoding any static data into the instructions. This may create more efficient code for modelling or simulating a system in which unchanging data does not need to be recalculated for each execution of the code on new input variables. This also may allow safe multithreaded execution of the code even if the original code describing the target function was not itself multi-thread safe which may increase the throughput of calculations.

Optionally, the method further comprises: defining an active data type; and, providing overloaded operators for the elementary operations wherein the output of the overloaded operators enacted on an active data type variable comprises computer code instructions according to step (i) and/or step (ii).

According to a second aspect of the invention a computer implemented method is provided for operating on a target function to provide computer code instructions configured to implement the target function, the method comprising: defining an active data type; evaluating the target function using active data type variables; determining, based on the target function, a linearized computational map, LCM, of the target function wherein each node of the LCM comprises an elementary operation; providing overloaded operators for the elementary operations wherein the output of the overloaded operator enacted on an active data type variable comprises computer code instructions to evaluate the elementary operation of the overloaded operator; and, hardcoding any static data into the instructions output by the overloaded operators. This allows safe multithreaded evaluation of the target function even if the original code describing the target functions was not itself multithread safe.

Optionally, the method according to the second aspect of the invention may further comprise forming the instructions for the each node prior to performing said steps for a subsequent node of the LCM. This provides a streaming compiler.

Preferably, instructions are written in computer code configured to be executed directly by a CPU, preferably wherein the computer code is binary object code. This allows for the compiled functions according to either method to be executed directly on a CPU without any further interpretation.

Preferably, determining a linearized computational map of a target function comprises a single evaluation of the target function. This may allow the overhead associated with operator overloading to be encountered only on the single valuation. Multiple determinations of the linearized computational map may involve incurring the overhead on each pass.

Optionally, the instructions are configured to process independent instances of input data vectorised using native CPU vectorisation. This allows for increased throughput when executing the compiled functions.

Optionally, the instructions comprise memory to register allocation instructions. This allows for direct control of schedule of loading and unloading variables between their assigned memory locations and the registers of the processing unit. This can allow for tailored or optimized schedules which reduce the number of loads and unloads for more efficient code.

Preferably, the methods further comprise forming one or more auxiliary data structures to define a memory to register allocation.

Optionally, the computer code instructions are written sequentially in memory. This allows a continuous program to be formed.

Preferably, when the instructions according to step (i) of the first aspect of the invention are written sequentially in memory the instructions are written sequentially from beginning to end.

Preferably, when the instructions according to step (ii) of the first aspect of the invention are written sequentially in memory the instructions are written sequentially from end to beginning.

Preferably, the completed instructions sets created by step (i) and step (ii) are concatenated.

According to a further aspect of the invention a computer implemented method for operating on a target function to provide computer code instructions configured to implement automatic adjoint differentiation of the target function is provided, the method comprising: determining, based on the target function, a linearized computational map, LCM, of the target function wherein each node of the LCM comprises an elementary operation; for each node of the LCM forming computer code instructions configured to: (i) compute intermediate data associated with a forward function of an automatic adjoint differentiation algorithm; and, (ii) increment, according to the automatic adjoint differentiation algorithm, adjoint variables of the preceding connected nodes of the each node in dependence on the intermediate data; wherein forming computer code instructions for both step (i) and step (ii) for each node is performed prior to performing said steps for a subsequent node of the LCM. This allows the forward and reverse functions of an automatic adjoint differentiation algorithm to be formed in parallel. The entire forward function need not be observed before construction of the reverse function.

According to a further aspect of the invention a computer implemented method for operating on a target function to provide computer code instructions configured to implement automatic adjoint differentiation of the target function is provided, the method comprising: determining, based on the target function, a linearized computational map, LCM, of the target function wherein each node of the LCM comprises an atomic operation; for each node of the LCM forming computer code instructions configured to: (i) evaluate the atomic operation for the each node, and the partial derivative of said atomic operation with respect to each of the preceding connected nodes of the LCM; and, (ii) increment an adjoint variable of the preceding connected nodes by the adjoint variable of the each node multiplied by the partial derivative of the each node with respect to the preceding connected node; wherein forming computer code instructions for both step (i) and step (ii) for each node is performed prior to performing said steps for a subsequent node of the LCM. This allows the formation of the forward and reverse functions of an automatic adjoint differentiation algorithm to be formed in parallel. The entire forward function need not be observed before construction of the reverse function.

According to a further aspect of the invention a computer implemented method for operating on a target function to provide computer code instructions configured to implement automatic adjoint differentiation of the target function is provided, the method comprising: determining, based on the target function, a linearized computational map, LCM, of the target function wherein each node of the LCM comprises an elementary operation; for each node of the LCM forming computer code instructions configured to: (i) evaluate the elementary operation for the each node, and the partial derivative of said elementary operation with respect to each of the preceding connected nodes of the LCM; and, (ii) increment an adjoint variable of the preceding connected nodes by the adjoint variable of the each node multiplied by the partial derivative of the each node with respect to the preceding connected node; wherein forming computer code instructions for both step (i) and step (ii) for each node is performed prior to performing said steps for a subsequent node of the LCM. This allows the formation of the forward and reverse functions of an automatic adjoint differentiation algorithm to be formed in parallel. The entire forward function need not be observed before construction of the reverse function.

According to a further aspect of the invention a digital model or simulation of a system is provided wherein the model comprises calculating derivative information using any of the methods disclosed herein.

A computer program product may be provided comprising program instructions configured to program a processor to perform any of the methods disclosed herein.

A linearized computational map, LCM, which may be a description of a function or computer program or model, satisfies one or more of the following requirements: each assignment statement has a different variable on the left-hand side (for example the LCM may comprise a version of the target function in which all assignment statements assign a value to a different variable from the other assignment statements of the LCM); all loops are unrolled; all procedure calls are inline; conditional statements that depend on static data are taken once; conditional statements that depend on input variables are handled using indicator functions; only instructions which perform elementary operations are used, these instructions may be those with a straightforward analogue as processor intrinsic functions.

SPECIFIC DESCRIPTION

A computer program evaluates an arbitrary mathematical function by executing a sequence of elementary expressions, therefore it is possible to determine or extract a computational map 100 of the function or program that describes the order of evaluation of the elementary operation and the execution flow of the program. The nodes of the computational map 100 correspond to the elementary operations and the edges indicate the flow of information between them, i.e. the inputs and outputs of the elementary functions.

Figure 1:
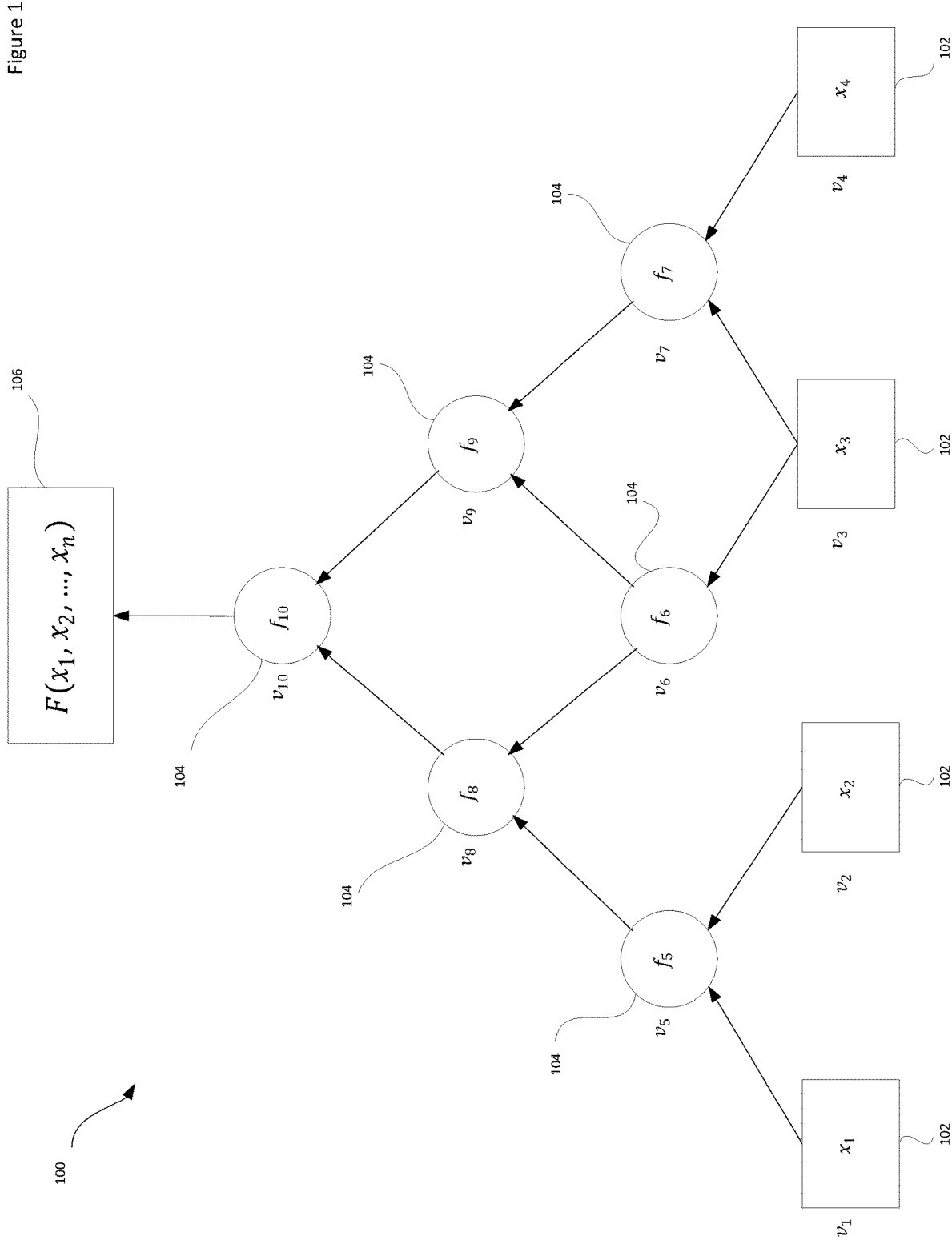
FIG. 1 is a computational map of an example target function.

FIG. 1 shows a computational map 100 of an example user function $y=F(x_1, x_2, x_3, x_4)$. The user function takes four independent variables $x_i$ represented by initialisation nodes 102 and has one dependent variable y represented by the result node 106. The user function comprises six elementary or atomic operations $f_i$, represented by the intermediate nodes 104, which may be operations intrinsic to the computer or processor. The illustrated target function could be expressed in terms of these as, $$F(x_1,x_2,x_3,x_4)=f_{10}(f_8(f_5(x_1,x_2),f_6(x_3)),f_9(f_6(x_3),f_7(x_3,x_4))).$$

To evaluate the function for a given set of inputs one initialises the initialisation nodes 102 to have the given input values and traverses the computational map 100 of FIG. 1 from bottom to top.

If the output of each node of the computational graph is written to a different program variable $v_i$ then a straight line program, with nothing overwritten, which evaluates the example function can be written as in Table 1. It is of course not necessary, in general, that the result of each intermediate node is written to a new program variable with an assigned position in memory.

TABLE 1

| Node | Forward |
|---|---|
| Initialization | $v_1 = x_1$ |
| Initialization | $v_2 = x_2$ |
| Initialization | $v_3 = x_3$ |
| initialization | $v_4 = x_4$ |
| $f_5$ | $v_5 = f_5(v_1, v_2)$ |
| $f_6$ | $v_6 = f_6(v_3)$ |
| $f_7$ | $v_7 = f_7(v_3, v_4)$ |
| $f_8$ | $v_8 = f_8(v_5, v_6)$ |
| $f_9$ | $v_9 = f_9(v_6, v_7)$ |
| $f_{10}$ | $v_{10} = f_{10}(v_8, v_9)$ |
| Result | $y = v_{10}$ |

More generally, a linearized computational map 100 for a function executed by a computer processor can be written as follows:

A user may have a target function or subprogram, described as $(y_1, \ldots, y_m)=F(x_1, x_2, \ldots, x_n)$, which has n input values and m output values. The target function can be expressed in terms of elementary operations $f_i$ each having $n_i$ input values. The evaluation of $(y_1, \ldots, y_m)= F(x_1, x_2, \ldots, x_n)$ can be represented as a computational map 100 with intermediate nodes 104 representing the elementary operations $f_i$ which take inputs from the outputs of the preceding connected nodes in the map and an output that is the result of the function $f_i$ enacted on those input nodes.

In the following, the notation $\tau_i$ represents a map from $\{1, \ldots n_i\}$ to $\{1, \ldots i-1\}$, that selects the $n_i$ input variables to the function $f_i$ of node i that are the preceding connected (or "parent") nodes, e.g. for node 8 in FIG. 1: $f_8(v_{\tau_8 1}, v_{\tau_8 2})=f_8(v_5, v_6)$.

```
//ALGORITHM 1
For i from 1 upto n do //Start by assigning x_n to program variables at the
initialisation nodes 102
    v_i = x_i;
enddo
For i from n + 1 to N do
    v_i = f_i(v_{τ_i 1}, ... v_{τ_i p_i}) //evaluate the intermediate nodes 104 of the LCM
    100
enddo
for i from N + 1 to N + m do
    y_{i−N} = v_{i−m} // assign the results at the result nodes 106 to y_m
enddo
{(y_1, ... , y_m) = F (x_1, ... , x_n)}
```

For each input node of the LCM 100 of the target function, the input variables are assigned to a program variable. For each intermediate node the elementary or atomic operation associated with that node is performed on the variables of the preceding connected nodes of the each node and the result is assigned to a new program variable. For the output nodes the results of the calculation are assigned to program variables. In the language of the present description Algorithm 1 describes a 'forward function' associated with the target function, that is, a function whose direction of execution flow does not oppose that of the target function.

In an automatic differentiation protocol, one has a program which calculates a numerical value of a function for given inputs, such as that described above and in relation to FIG. 1. What is desired is the transformation of that program into a program that calculates the derivative(s) of that function. The transformed program uses repeated applications of the chain rule applied to floating point numerical values.

AD has two modes of operation as the chain rule of differentiation can be applied 'forwards' or in 'reverse'.

Forward mode differentiation fixes the independent variables and computes the recursive derivative:

$$\frac{\partial v_i}{\partial x} = \left(\frac{\partial v_i}{\partial v_{i-1}}\right)\left(\frac{\partial v_{i-1}}{\partial x}\right)$$

Reverse mode differentiation fixes the dependent variable(s) and computes the recursive derivative:

$$\frac{\partial y}{\partial v_i} = \left(\frac{\partial y}{\partial v_{i+1}}\right)\left(\frac{\partial v_{i+1}}{\partial v_i}\right)$$

Automatic adjoint differentiation (AAD) fixes the dependent variables of a function and computes the derivative with respect to the constituent elementary expressions recursively. In AAD the 'adjoint' is the quantity of interest, which is the derivative of a chosen dependent variable with respect to a subexpression v:

$$\bar{v} = \frac{\partial y}{\partial v}$$

Given a function $F(x_1, x_2, x_3 \ldots x_n) = (y_1, y_2, y_3 \ldots y_m)$ the desired result is to find $F' = [dy_i/dx_j]$.

In forwards mode, the flow of derivative information is in the same order as the flow of the order of the evaluation of the function. That is, the information flows from the bottom of the computational map 100 to the top. The opposite is the case in the reverse mode. In the reverse mode, the program to evaluate the derivatives is adjoint to the forward program. In transforming the user program to evaluate the target function to one in which the adjoint variables are also calculated, there must be some flow of information in the opposite direction to that of the original target function.

In an AAD algorithm it is therefore required that some intermediate data are first created by a forward function and preserved for use by a reverse function as well, as the instructions that produced the intermediate data, before the reverse program can be evaluated.

Utilising the reverse mode of AAD is advantageous in the frequently encountered scenario in which the function $F(x_1, x_2, x_3 \ldots x_n) = (y_1, y_2, y_3 \ldots y_m)$ has more inputs than outputs, that is n>m. This is because to evaluate the derivatives of $y_i$ with respect to each of the input variables, the forwards mode of differentiation requires n sweeps over the computational map, one for each input, whereas the reverse mode requires only m sweeps over the computational map, one for each output.

Figure 2:
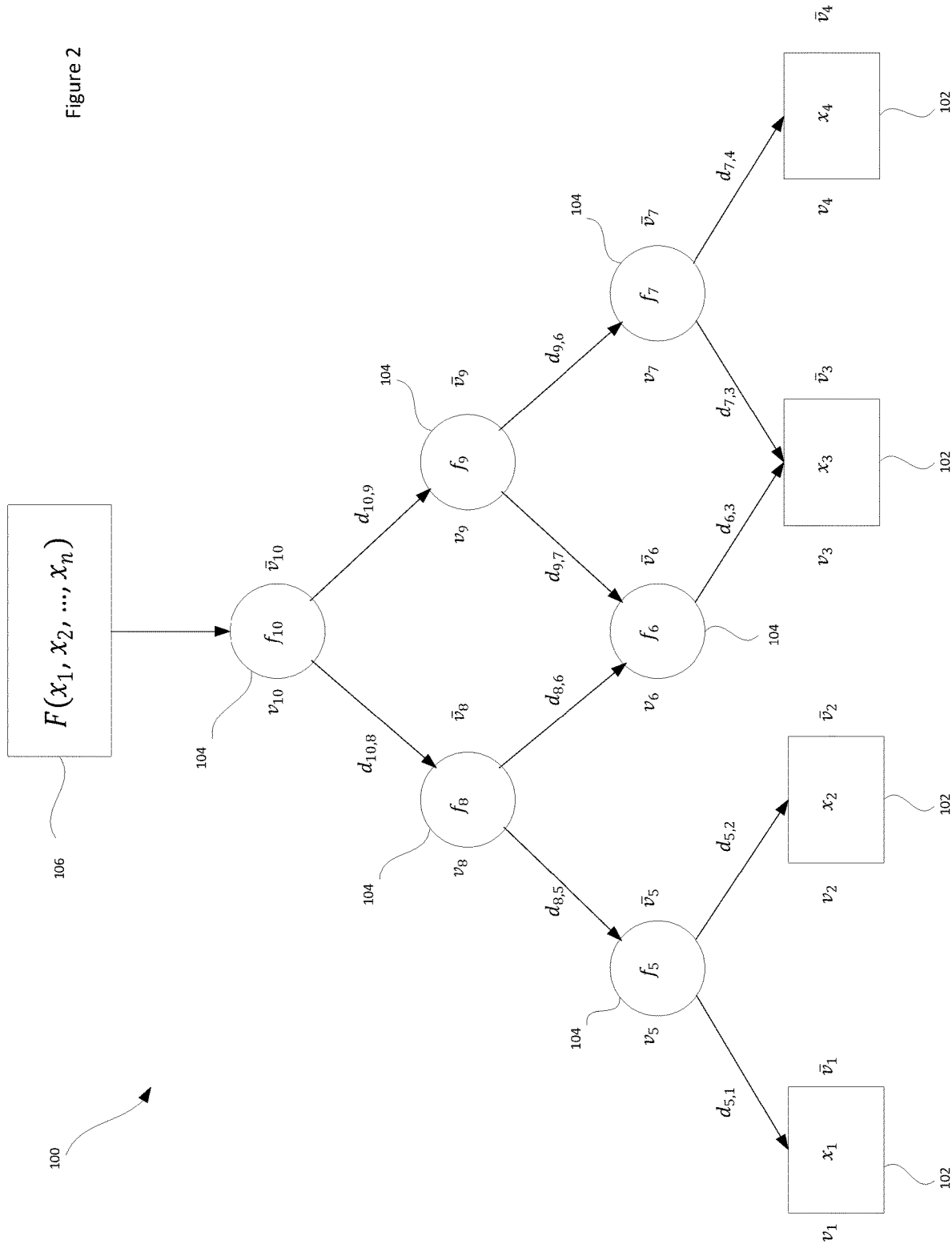
FIG. 2 is a computational map of an example target function, augmented with partial derivatives and adjoint variables.

FIG. 2 shows a computational map 100 for evaluating the derivatives of the example user target function of FIG. 1 with the automatic adjoint differentiation (AAD) technique using the algorithm described below. The flow of information required to calculate the adjoint variables is indicated by the arrows. The execution flow of a reverse function associated with the AAD method goes from top to bottom of the computation map in contrast to the execution flow for evaluating the target function itself, or a forward function.

In general a target function $(y_1, y_2, y_3 \ldots y_m) = F(x_1, x_2, x_3 \ldots x_n)$ has n input values and m outputs. The target function can be expressed in terms of elementary operations $f_i$ each having $n_i$ input values. The evaluation of $(y_1, y_2, y_3 \ldots y_m) = F(x_1, x_2, x_3 \ldots x_n)$ can be represented as a computational map 100 with nodes comprising the atomic operations $f_i$ which take inputs from the outputs of previous nodes in the map and an output that is the function $f_i$ enacted on those input nodes. The user desires the derivatives F' of the target function. To calculate these, the partial derivatives may be required. We indicate a partial derivative in the notation:

$$d_v = \frac{\partial}{\partial v}.$$

An automatic adjoint differentiation algorithm that performs such a calculation is:

```
//ALGORITHM 2
//FORWARD
For i from 1 upto n do//Start by assigning x_n to program variables at the initialisation nodes 102
    v_i=x_i
    v̄_i = 0.0 // initialize adjoint variables
enddo
for i from n + 1 to N do
    v_i = f_i(v_τi1,... v_τini) //evaluate atomic operation that corresponds to i^th node
    v̄_i = 0.0 // initialize adjoint variable for i^th node of computational map 100
    for j from 1 to n_i do
        d_ij = d_vτij f_i(v_τi1, ... v_τini) //evaluate partial derivatives of node with respect to
            input variables to that node
    enddo
enddo
for i from N + 1 to N + m do
    y_{i−N} = v_{i−m}
enddo
```

```
//REVERSE
for j from N + 1 to N + m do
    v̄_{i-N} = ȳ_{i-m}        //initialise adjoint variables for the result nodes
enddo
For i from N down to n + 1 do
    For j from 1 to n_i
        v̄_{τij} += v̄_i*d_{ij}   //increment adjoint variables according to AAD method
    enddo
enddo
for i from n down to 1 do
    x̄_i = v̄_i
enddo
```

In the forward portion of the algorithm, for each initialisation node 102 of the LCM 100 of the target function: the operations to assign the input variables to program variables are performed; and, the operation to initialise the adjoint variables for the each initialisation node 102 is performed. For each intermediate node 104 of the LCM 100, starting from the bottom (the intermediate nodes 104 connected to the initialisation nodes 102) and traversing the computational map 100 towards the top (the intermediate nodes 104 connected to the result nodes 106): the elementary (e.g. atomic) operation associated with the each intermediate node 104 is performed on the variables of the preceding connected nodes of the each node and the result is assigned to a new program variable; the operation to initialise the adjoint variables for the each intermediate node is performed; for each of the preceding connected nodes of the each intermediate node 104, the partial derivative of the each intermediate node 104 with respect to the preceding connected node is performed. For the result nodes 106 the results of the calculation of the final elementary operations are assigned to program variables. In the reverse portion of the algorithm, for the result nodes 106 the adjoint variables are initialised. The adjoint variable associated to the result node corresponding to the dependent variable with respect to which the user desires to calculate derivatives is initialised to 1, all others are initialised to 0. For each intermediate node 104 of the LCM 100, starting from the top (the intermediate nodes 104 connected to the result nodes 106) and traversing the computational map 100 towards the bottom (the intermediate nodes 104 connected to the initialisation nodes 102): the adjoint variable of the preceding connected node of the each intermediate node 104 is incremented by the adjoint variable of the each node multiplied by the partial derivative of the each node with respect to the preceding connected node. For each initialisation node 102 the operations may be performed to assign the adjoint variables of the each initialisation node 102 to output adjoint variables.

The derivatives $$\frac{\partial F}{\partial x_i}$$

are given by $\bar{v}_i$ for $1 \leq i \leq n$. Note that the loop over i for the 'reverse' function, which increments the adjoint variables, runs from N down to n+1 because the reverse function is performed with the opposite execution flow to the forward function. In the reverse function the adjoint variables of the preceding connected nodes of the node are incremented in dependence on the partial derivative of the node with respect to the preceding node and the adjoint of the node. Note that $\tau_i j < i$, so the flow of information in the reverse function is traversing the graph in the opposite direction to the forward function.

Evidently, for the reverse function to be implemented, the $d_{ij}$ must exist in memory or at least be calculable during the reverse portion of the algorithm. This means that some information must be saved by the forward function to which the reverse function will have access when subsequently executed. Clearly this might simply be the list of the $d_{ij}$ themselves. Alternatively, if a mixture of the $v_i$ and $d_{ij}$ are saved by the forward function, as well as the instructions that produced them, it is possible to calculate the $d_{ij}$ on the reverse pass in order to update the adjoint variables.

The described algorithm is one example of an automatic adjoint differentiation algorithm; numerous variations will be appreciated by those skilled in the art. Intermediate data are stored associated with the intermediate nodes 104 of the computational map 100 when a forward function of the algorithm is executed. These intermediate data allow the adjoint variables to be calculated by a corresponding reverse function. In the exemplary algorithm described above the intermediate data are the partial derivatives of the functions of each node with respect to the input variables to the node. Intermediate data may also be the value of the function evaluated at that node, or any information which can be used by the reverse function to make the calculations necessary to determine the adjoint variables.

For simplicity, the remainder of the disclosure will use the example of the $d_{ij}$ being the intermediate data, all of which are calculated during the execution of the forward function of the algorithm, but this does not in any way imply a restriction of the disclosed methods and apparatus as applying solely to such an implementation of AAD. The existence of equivalent or alternative forward and reverse functions according to AAD will be appreciated by those the skilled in the art.

The linearized computational map 100, augmented with the differentials and adjoints as described in the particular AAD algorithm above for an example target function taking four inputs to produce one output is shown in Table 2.

As can be observed clearly in Table 2, the variables $v_i$ and $d_{ij}$ can be evaluated in the order of the evaluation of the target function. Note that for a node i in the forward column none of the expressions contain a variable with an index j>i. However, the adjoint variables $\bar{v}_i$ can only be evaluated after the forward function has been evaluated and must be performed in the reverse order.

The forward function therefore comprises expressions which can be evaluated in the same order as the execution flow of the target function. The reverse function, at least in part, requires expressions which must be evaluated in the opposite order. That is, the execution of the reverse function requires intermediate data provided by the forward function being evaluated in advance.

Existing techniques to implement AAD save a 'tape' of an evaluation of the target function and the execution of the forward and reverse functions of an AAD method assumes the interpretation of that tape. Existing techniques do not produce instructions to execute forward and reverse functions with respect to an AAD method which are ready to be executed directly by a CPU. The present disclosure describes a method for compiling the target function into forward and reverse functions in which the instructions to perform the reverse function can be built without the forward function being constructed in full in advance; in fact, instructions to execute a forward and reverse function can be constructed in parallel.

TABLE 2

| Node | Forward | Reverse |
|---|---|---|
| Initialization ↓ | $v_1 = x_1$ $\bar{v}_1 = 0$ | |
| Initialization ↓ | $v_2 = x_2$ $\bar{v}_2 = 0$ | |
| Initialization ↓ | $v_3 = x_3$ $\bar{v}_3 = 0$ | |
| initialization ↓ | $v_4 = x_4$ $\bar{v}_4 = 0$ | |
| $f_5$ ↓ | $v_5 = f_5(v_1, v_2)$ $d_{5,1} = d_{v_1}f_5(v_1, v_2)$ $d_{5,2} = d_{v_2}f_5(v_1, v_2)$ $\bar{v}_5 = 0$ | ↑ $\bar{v}_1 \mathrel{+}= \bar{v}_5 * d_{5,1}$ $\bar{v}_2 \mathrel{+}= \bar{v}_5 * d_{5,2}$ |
| $f_6$ ↓ | $v_6 = f_6(v_3)$ $d_{6,3} = d_{v_3}f_7(v_3)$ $\bar{v}_6 = 0$ | ↑ $\bar{v}_3 \mathrel{+}= \bar{v}_5 * d_{6,3}$ |
| $f_7$ ↓ | $v_7 = f_7(v_3, v_4)$ $d_{7,3} = d_{v_3}f_7(v_3, v_4)$ $d_{7,4} = d_{v_4}f_7(v_3, v_4)$ $\bar{v}_7 = 0$ | ↑ $\bar{v}_3 \mathrel{+}= \bar{v}_7 * d_{7,3}$ $\bar{v}_4 \mathrel{+}= \bar{v}_7 * d_{7,4}$ |
| $f_8$ ↓ | $v_8 = f_8(v_5, v_6)$ $d_{8,5} = d_{v_5}f_8(v_5, v_6)$ $d_{8,6} = d_{v_6}f_8(v_5, v_6)$ $\bar{v}_8 = 0$ | ↑ $\bar{v}_5 \mathrel{+}= \bar{v}_8 * d_{8,5}$ $\bar{v}_6 \mathrel{+}= \bar{v}_8 * d_{8,6}$ |
| $f_9$ ↓ | $v_9 = f_9(v_6, v_7)$ $d_{9,6} = d_{v_6}f_9(v_6, v_7)$ $d_{9,7} = d_{v_7}f_9(v_6, v_7)$ $\bar{v}_9 = 0$ | ↑ $\bar{v}_6 \mathrel{+}= \bar{v}_9 * d_{9,6}$ $\bar{v}_7 \mathrel{+}= \bar{v}_9 * d_{9,7}$ |
| $f_{10}$ ↓ | $v_{10} = f_{10}(v_8, v_9)$ $d_{10,8} = d_{v_8}f_{10}(v_8, v_9)$ $d_{10,9} = d_{v_9}f_{10}(v_8, v_9)$ $\bar{v}_{10} = 0$ | ↑ $\bar{v}_8 \mathrel{+}= \bar{v}_{10} * d_{10,8}$ $\bar{v}_9 \mathrel{+}= \bar{v}_{10} * d_{10,9}$ |
| Initialization ↓ | $y = v_{10}$ | ↑ $v_{10} = 1$ |

Figure 3:
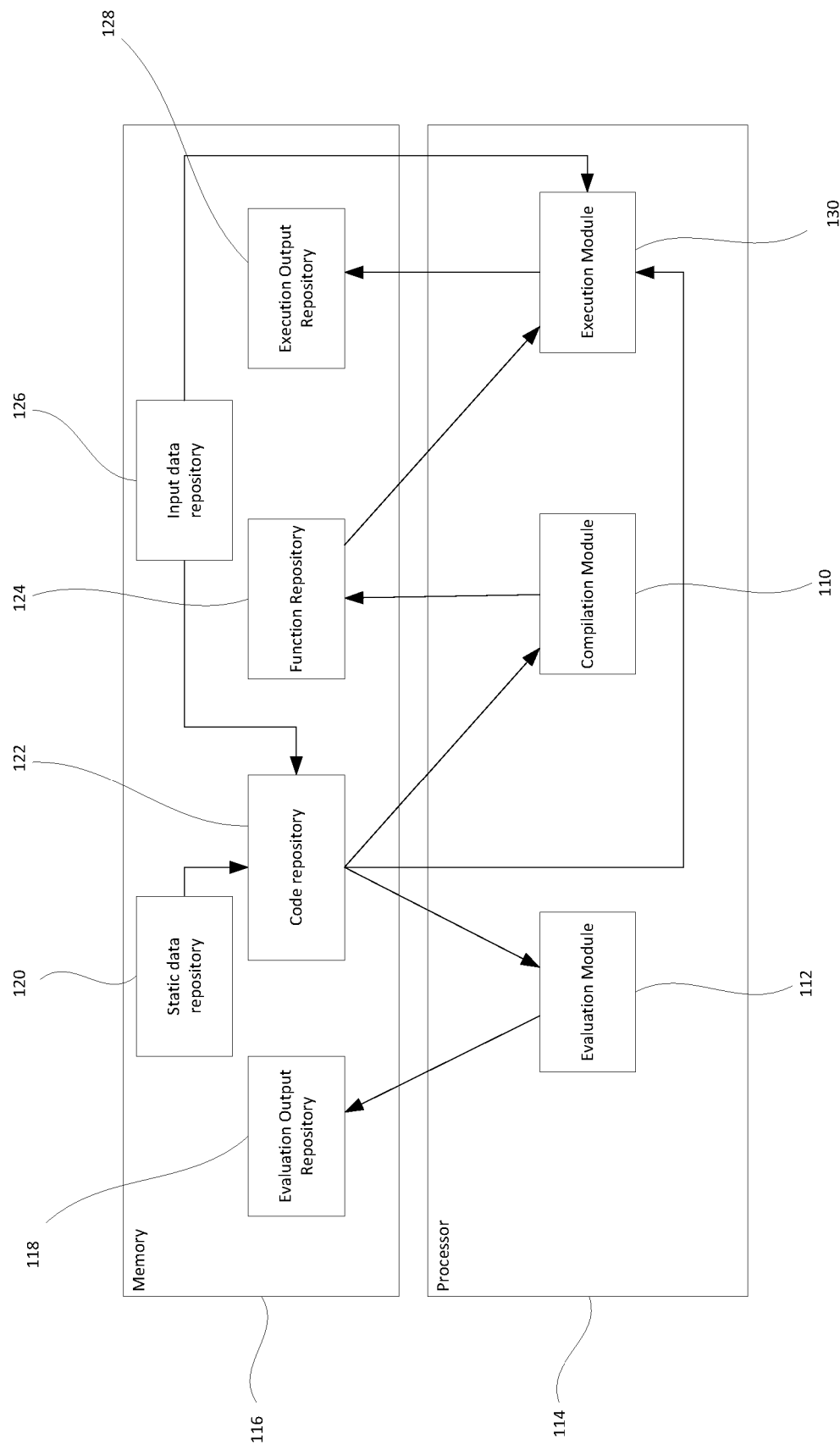
FIG. 3 is a functional module diagram of a computer configured to perform compilation of the target function according to an AAD method.

FIG. 3 shows a number of functional modules which are configured to process information according to a preferred embodiment of the disclosure. These are: an evaluation module 112, a compilation module 110 and an execution module 130. Functional modules which are configured to store data are also shown. These are the code repository 122, the function repository 124, the execution output repository 128, the static data repository 120, the input data repository 126 and the evaluation output repository 118. Data stored in these modules are loaded into processing modules for processing, or data are saved into the storage modules by the processing modules. The flow of data is indicated by the arrows and summarized in Table 3.

The code repository 122 is configured to store a user program and any APIs (e.g. software libraries) which may be required by the user to the implement the AAD method. This user program comprises a definition of the target function or a subprogram that the user wishes to differentiate, and logic to make API calls, including calling functions and classes from any software libraries. In a preferred embodiment of the present disclosure the user program is written in a high level computer programming language, preferably C++ or another language compatible with operator overloading. The user program in the code repository 122 may be compiled and run from the code repository 122 using the usual build compile and execution protocols associated with the computer programming language in use.

The compilation module 110 is configured to transform the user's target function or subprogram defined within the code repository 122 into computer code configured to calculate the user function and/or the derivatives of the function. This can occur at the runtime of the user program. Preferably the computer code produced by the compilation module 110 is written in a low level computer programming language, preferably one which is suitable to be executed directly by a computer processor, for example, binary object code. The computer code produced by the compilation module 110 is configured to evaluate, when executed, a forward and reverse function according to an AAD algorithm.

In the preferred embodiment, the compilation module 110 takes as its input the API calls made by the user program at runtime. Each node 102 104 106 of the computational map 100 has an API call associated with it. The compilation module 110, may therefore be configured to determine the computational map 100 of the target function by means of the sequence of API calls it receives. At runtime of the user program, the target function is passed a specific set of input variables. The compilation module 110 may be able to extract or determine the computational map of this function by a single evaluation of the target function for the arbitrary input variables.

An API call may call a specific function or functions to act on particular data, for example, a mathematical or Boolean operation on one or more program variables.

The compilation module 110 is configured to differentiate the following elementary operators and functions:

The standard binary mathematical operations, for example, +, −, * and /.

The assignment versions of these operators.

The mathematical functions: sqrt, exp, abs, log, pow and, other elementary mathematical functions.

Logic functions, for example, If, lower.bound, max, min.

Logic comparators, for example, ==, <, >, !=, <=, >=.

The API calls to the compilation module 110 may be implemented by an operator overloading method. An API may define a new 'active' data type which overloads the elementary operations and function such that when these are executed the overloaded operator returns both the elementary operations and its partial derivatives with respect to its inputs. According to preferred embodiments of the disclosure in addition to, or rather than, evaluating the functions and its differentials and providing numerical values as its output, the overloaded operators may also write into memory the instructions that produce these outputs. The instructions may be written in a computer programming language such that evaluation of the function may later be replicated, and its derivatives calculated, by execution of the instructions. The programming language in which the instructions are written is binary object code to perform elementary operation on CPU registers. The instructions might also be written in assembly code or machine or any lower level programming language than that of the user program. It is particularly advantageous for the speed of execution for the instructions to be written in computer code that does not require any interpretation before execution.

The expression or expressions to be differentiated (the target function) can be passed variables of a special "active" type, or adouble, in the language of the API. Integer and Boolean variables can also be substituted by the user for their "active" analogues aint and abool if their values are not constant.

In this way the compilation module 110 is configured to record the forward and reverse functions according to an AAD method associated to a user target function when that user function is enacted on the active variable type. The compilation module 110 therefore is able to store instructions for the forward and reverse functions that are independent of the values of the input variables. The recorded forward and reverse functions can therefore later be reused for arbitrary input variables. A special API call may be provided to initiate the recording of the instructions. A special API call may be provided to terminate the recording of the instructions. Creation of the compiled forward and reverse functions occurs during the execution of code between these API calls.

The compilation module 110 is therefore configured to output computer code instructions to calculate the differentials of the target function according to an automatic adjoint differentiation algorithm. The computer code instructions can be categorized as belonging to 'forward' and 'reverse' functions depending on whether their executions flow matches that of the user's target function. The computer code instructions output by the compiler module are stored in the function repository 124. The compilation module 110 may be configured to produce the instructions as a stream, and further producing the instructions for the forward and reverse functions in parallel for each API call.

The function repository 124 is configured to store in memory the compiled forward function 146 and compiled reverse function 148 produced by the compilation module 110.

The execution module 130 is configured to execute the compiled functions on input data 150 to produce output data 126 128. The output data 126 128 may contain the derivatives of the target function produced by the reverse function and evaluations of the target function itself which may be produced the forward function. The execution module 130 has access to a local memory 154, which is only accessible to the execution module 130. The execution module 130 may be further subdivided into a number of execution contexts 152, each of which may have a segregated portion of the local memory 154 associated with it. In the preferred embodiments the local memory 154 associated with the executions module is not shared with any other modules of the compiler architecture. The local memory 154 is where the intermediate data created by the forward function when executed will be stored. This is described in more detail later with reference to FIG. 9.

The execution output repository 128 is configured to store the data output by the compiled forward function 146 and/or reverse function 148 when executed by the execution module 130 on input data which may be received from the input data repository 126. This may contain numerical evaluations of the target function(s) and its derivatives.

The evaluation module 112 executes the code of the user program to produce outputs when the API is not called, or functions are evaluated with the typical data types, double, float, int. etc. rather than active data types.

The evaluation output repository 118 is configured to store data output by the evaluation of the user target function in the normal way, i.e. by compiling and executing user code to evaluate the target function with standard variable types and saving the outcome to memory.

The static data repository 120 is configured to store any data required for description of the target function that does not depend the independent variables over which the user desires to sweep. Static data created by the compilation module 110 may be hard coded into the instructions output by the compilation module 110, which are saved to the function repository 124. Static data created by execution of the target function, by the compilation module, or by any compiled functions according to the methods disclosed may also be saved to the static data repository 120.

The input data repository 126 is configured to store information about the input values for which the user may seek to evaluate the target function, or find derivatives thereof. This may be in the form of lists or matrices of input variables.

In many situations the user desires derivatives with respect of set of input values which will be swept over. That is, the user wish to reuse the compiled functions for a range of input data. These can be marked as input variables by the user in their computer code held in the code repository 122. The compilation module 110 is configured to identify data describing the target function which the user is not interested in changing. It is advantageous for the compilation module 110 to be configured to hard code the data which does not depend on the marked user input variables (i.e. the static data) into the computer code instructions that it is configured to write, this prevents unnecessary repetition of evaluations of unchanging data, making later repeated execution of the forward and reverse functions more efficient.

The compilation module 110 receives information as to which variables have been marked as inputs. The compilation module 110 may be configured to hardcode the value of variables which are not marked as input into the compiled functions. Any intermediate data produced that does not depend on the marked input variables can similarly be hardcoded in to the compiled forward function 146 and reverse function 148. As the value of these variables will not change from one set of input values to the next, the values themselves can be written into the computer code instructions (i.e. hardcoded) which will be more efficient.

To take an illustrative example:
adouble a(0.0); a.markAsInput( );
adouble b=exp(a+loadFromDataBase("FX/GBP/EUR"))+1.0;
b.markAsOutput( );

In the case where a user may wish to evaluate the derivatives with respect to a for a range of values a—is marked as an input variable, and declared with active type. The constant 1.0 constant double value is static and is hard coded into the compiled functions. The information loaded from the static data repository 120 by the loadFromDataBase is a static variable (assuming return value type of the function is double) and is also hard coded into recorded functions. b is a non-static output variable.

Compare with:
adouble a(0.0);
a.markAsInput( );
adouble fx=loadFromDataBase("FX/GBP/EUR");
fx.markAsInput( ); adouble b=exp(a+fx)+1.0;
b.markAsOutput( );

In this alternative scenario, fx is initialized from the static data repository 120, but marked as an input variable and hence should be specified before calling forward function. In this case the value of fx will not be hardcoded into the compiled forward function 146 and reverse function 148.

TABLE 3

| In | Module | Out |
| --- | --- | --- |
| API calls from code repository 122 with 'standard' variable types | → Evaluation module 112 → | Results of evaluation module 112 (user function evaluated with 'standard' variable types) |
| Results from evaluation module 112 (user function evaluated with 'standard' variable types) Static data used by target function. Input data variables (one instance) to the target function | Evaluation Output Repository 118 → Code repository 122 → | API calls |
| API calls from code repository 122 with 'active' variable types | → Compilation module 110 → | Compiled forward function 146 and compiled reverse function 148. |
| Compiled forward function 146 and compiled reverse function 148. | → Function repository 124 → | Compiled forward function 146 and compiled reverse function 148. |
| Compiled forward function 146 and compiled reverse function 148. Input data variables | → Execution module 130 → | Results of forward and reverse functions applied to input data variables |
| Results of forward and reverse functions applied to input data variables. | → Execution output repository 128 | |

Figure 4:
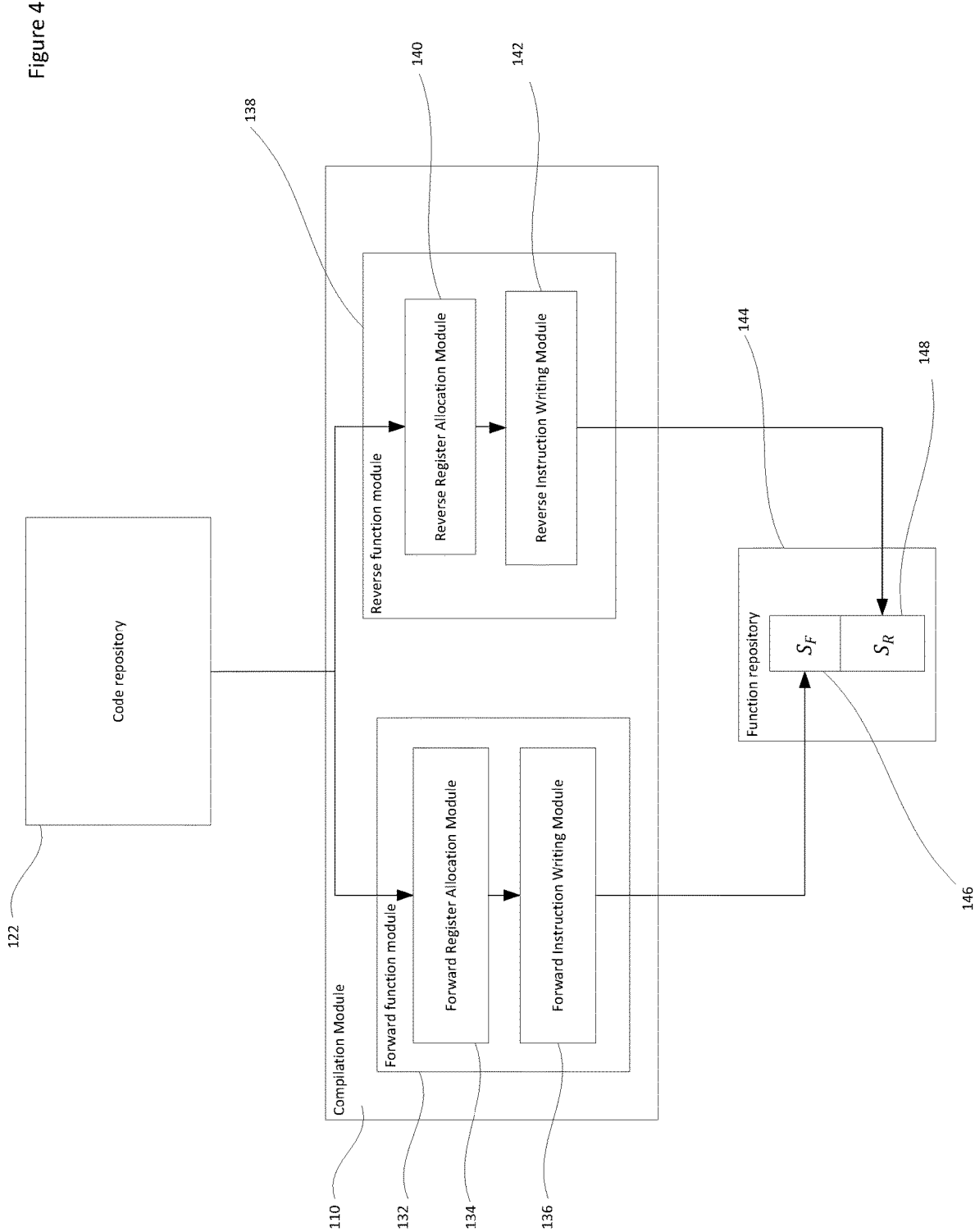
FIG. 4 is a functional module diagram of the compilation module.

FIG. 4 shows a computer architecture for an AAD compiler which is configured to write the forward and reverse functions in parallel and sequentially as each API call is made when the target function is evaluated for a given input at runtime of the user program.

The compilation module 110 is configured to receive the API calls from the user program when the target function is evaluated with 'active' type arguments. Both the forward function module 132 and reverse function module 138 are configured to receive the API call in parallel, so both have the information about: the current node index of the LCM 100; the node index of any preceding connected ("input") nodes to the current node; and, the elementary operation performed at the node. The forward function module 132 and the reverse function module 138 of the compilation module 110 are configured to write the instructions to perform the evaluations of the forward and reverse operations at that node in parallel. The forward and reverse function modules 138 are each split into two further modules: a register allocation module and an instruction writing module. Referring to Algorithm 2 and Table 2 this is sufficient information to form instructions for the forward function and reverse function instructions at the node i of the computational map 100.

The forward register allocation module 134 is configured to allocate variables to registers, and to write computer code to memory which loads and unloads program variables to the CPU registers. The forward register allocation module 134 may be configured to create and edit an auxiliary data structure to facilitate the allocation procedure. The forward register allocation module 134 is configured to write instructions to load and unload variables from the register to their allocated locations in memory. The forward instruction writing module 136 is responsible for writing the elementary mathematical operations for evaluating the mathematical operations, forming the derivatives etc. as required by a forward function, to be performed on the CPU registers for each node of the LCM 100 of the target function. This is one way to form computer code instructions.

The output of the forward function module 132 is therefore a set of computer code instructions $S_F$ to perform a forward function associated with a user target function. The new instructions written for each API call may be added to the end of the set of instructions $S_F$, thereby building computer code instructions to implement a forward function according to an AAD algorithm.

The reverse register allocation module 140 is configured to allocate variables to registers, and to write computer code to memory which loads program variables into the CPU registers and saves them back into their assigned memory locations as necessary. The reverse register allocation module 140 is configured to create and edit an auxiliary data structure to facilitate the allocation procedure. The reverse register allocation module 140 is configured to write instructions to load and unload variables from the register to their allocated locations in memory.

The reverse instruction writing module 142 is configured to write the elementary mathematical operations to be performed on the CPU registers in order to update or increment the adjoint variables. The output of the reverse function module 138 is therefore a set of instructions $S_R$ to perform a reverse function associated with a user target function. The new instructions written for each API call may be added to the beginning of the set of instructions $S_R$.

The completed list $S_F$ of forward instructions is also referred to as the compiled forward function 146. The completed list $S_R$ of reverse instructions is also referred to as the compiled reverse function 148. When completed these may be concatenated so that the full compiled computer code to perform a full AAD algorithm for the target function is provided sequentially in memory, thereby providing a computer program to implement a full AAD algorithm, such as that described in Algorithm 2.

Processor architectures typically allow the mathematical operations to be performed on a limited number of CPU registers and the object of the register allocation modules is to provide a schedule for loading and unloading variables from the memory to the registers for processing. In a preferred embodiment the compiled forward function 146 and compiled reverse function 148 require no interpretation to be executed by a CPU. The compiled forward function 146 and compiled reverse function 148 may be written in native CPU binary code. In such an embodiment there is no data structure corresponding to the canonical 'tape' of an AAD algorithm saved to memory that requires interpretation before later execution of the AAD algorithm. In a variation the output program of the compilation module 110 may be written in a text format that requires further compilation to obtain native CPU binary code.

Figure 5:
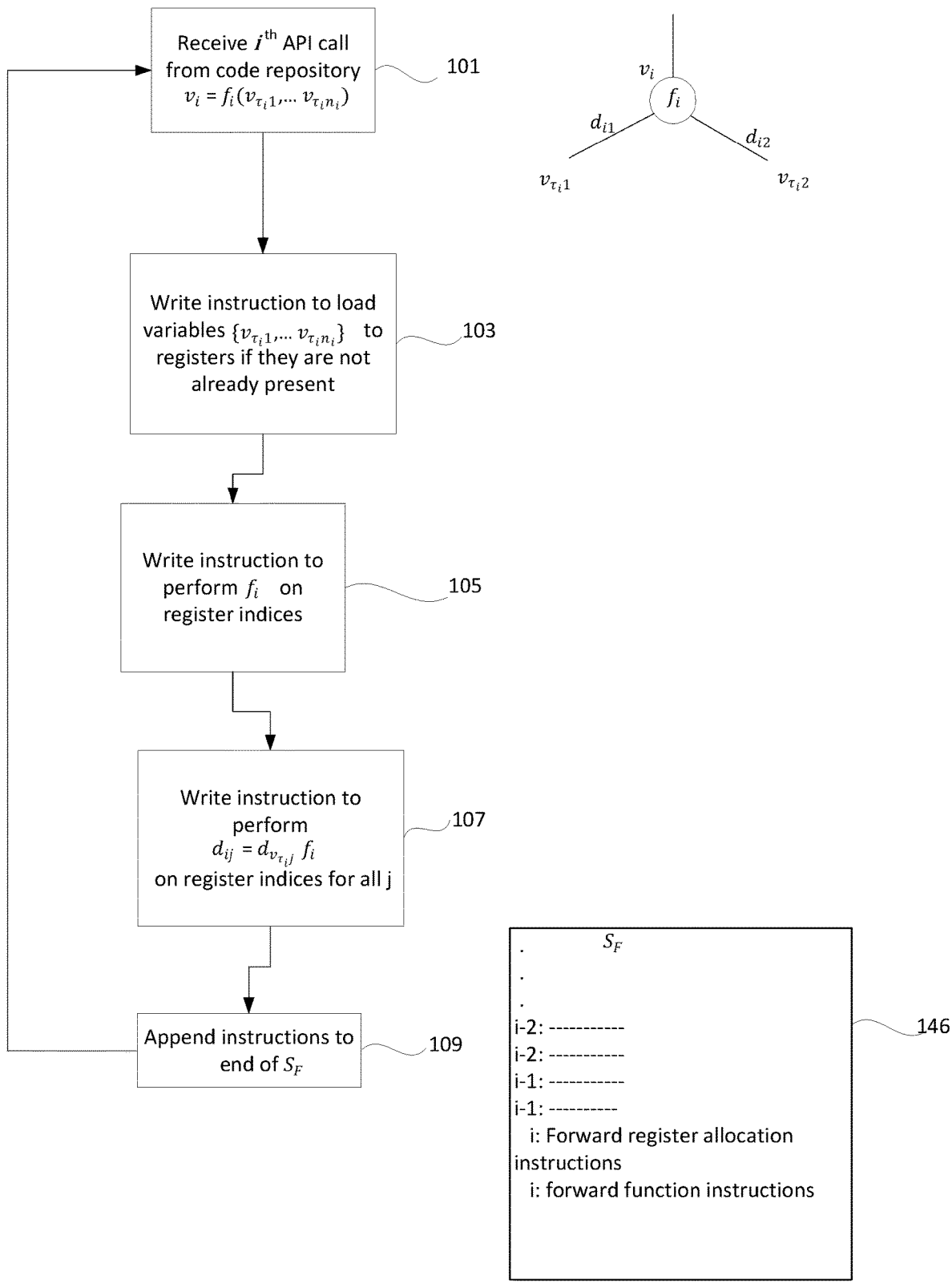
FIG. 5 is a flowchart describing the method of the forward function module.

FIG. 5 shows the method implemented by the forward function module 132 according to the AAD compiler for each API call. The forward function module 132 receives the API call in step 101. Having received the information related to the API call, in step 103 the forward function module 132 checks whether the variables required for evaluating $f_i$ and $d_{ij}$ would be present in the processor registers at execution time of the instruction by the execution module 130. If not, the register allocation module writes the instruction to the load the variables into a register and appends these instructions to the list of forward instructions $S_F$. A protocol achieving an exemplary memory-to-register allocation is described in greater detail with reference to FIG. 7. In step 105 the instruction to perform the function $f_i$ on the registers assigned to the relevant variables is formed by the forward function module 132. In step 107 the instruction to evaluate $d_{ij}$ for each j is also formed by the forward function module 132. In step 109, the instructions produced by steps 105 and 107 are also appended to the set $S_F$. The described steps are examples of forming computer code instructions.

Figure 6:
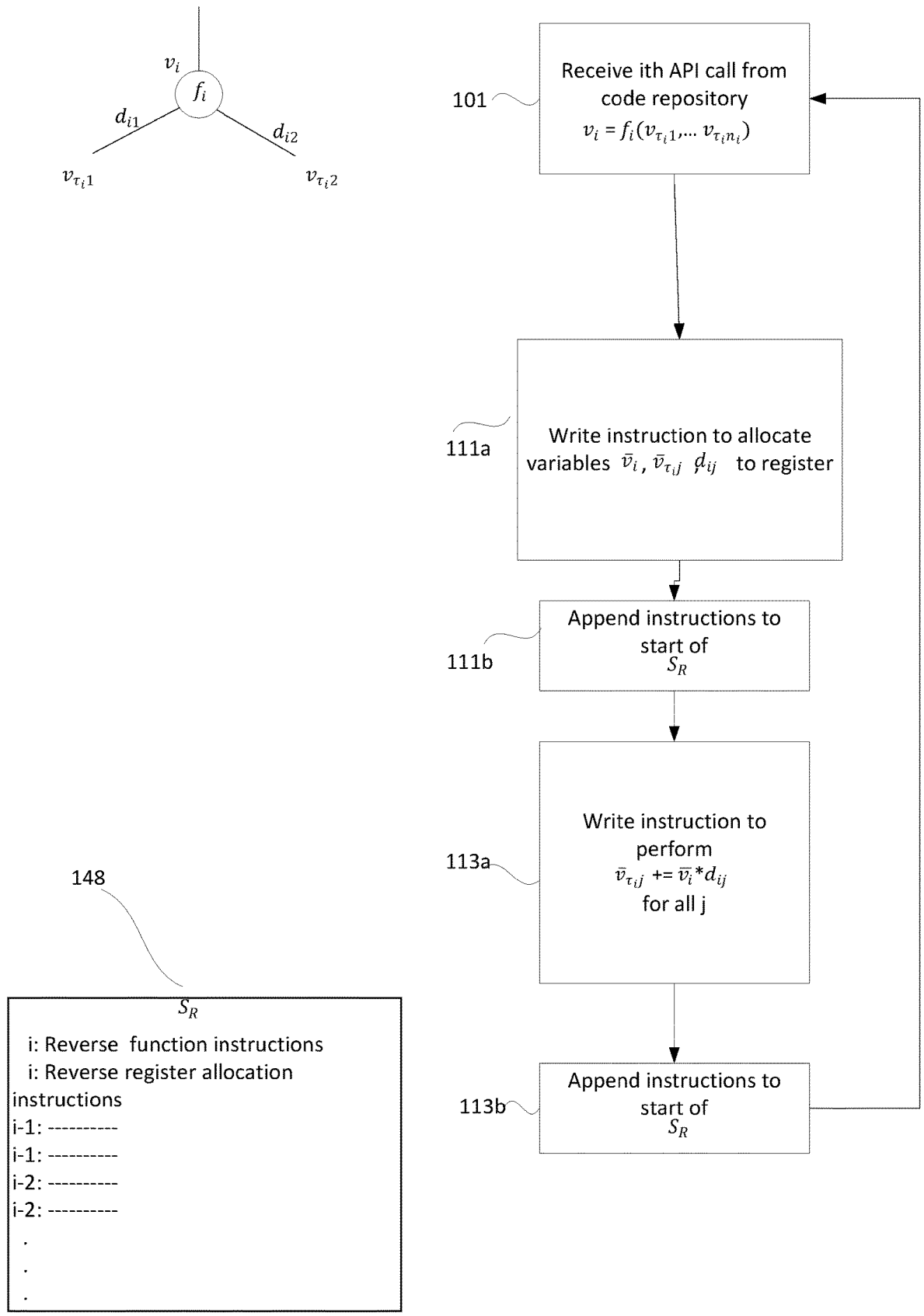
FIG. 6 is a flowchart describing the method of the reverse function module.

FIG. 6 shows the method implemented by the reverse function module 138. In parallel with the forward function module 132, the reverse function module 138 creates the instructions to implement the operations associated with the adjoints to the forward function at each node. Although the reverse function cannot be evaluated until the forward function has been evaluated, the instructions to implement the reverse function can be created in parallel with those of the forward function. The present disclosure therefore describes a streaming compiler in which the forward and reverse functions are created in parallel.

In step 101, the reverse function module 138 receives the ith API call. In step 111a the reverse function module 138 allocates the variables $\bar{v}_i$, $\bar{v}_{\tau_i j}$ and $d_{ij}$ to processor registers. In step 111b instructions to load and unload the variables from the memory into a processor register according to a memory to register allocation protocol are formed and prepended to set $S_R$. A protocol achieving an advantageous memory-to-register allocation is described in greater detail with reference to FIG. 8. In step 113a, the instruction to increment the adjoint variable $\bar{v}_{\tau_i j} += \bar{v}_i * d_{ij}$ is formed and in step 113b then prepended to the set $S_R$. Steps 113a and 113b are repeated for all input nodes j to each node i. The described steps are examples of forming computer code instructions.

The reverse function module 138 is configured to write the instructions that are configured to calculate the adjoint variables as described by the AAD algorithm.

One method of implementing the methods illustrated in FIGS. 4 and 5 is to use operator overloading. That is, the operators which perform the functions $f_i$ can be overloaded to provide a record of the instructions used to implement the usual evaluation of the function, as well as instruction to evaluate the derivatives of the function with respect to its inputs and, the instructions to increment the adjoint variables.

The compiled forward function 146 and compiled reverse function 148 do not change once they have been compiled. The compiled function can be used for arbitrary input data for the variables marked as input by the user. Significantly, this means that if operator overloading is used to implement the compilation there is no operator overloading runtime overhead per input data sample. All static data is hardcoded into the compiled functions. The compiled forward function 146 and compiled reverse function 148 can be automatically vectorised such that they are single instruction multiple data instructions which take advantage of any native CPU vectorisation.

Figure 7:
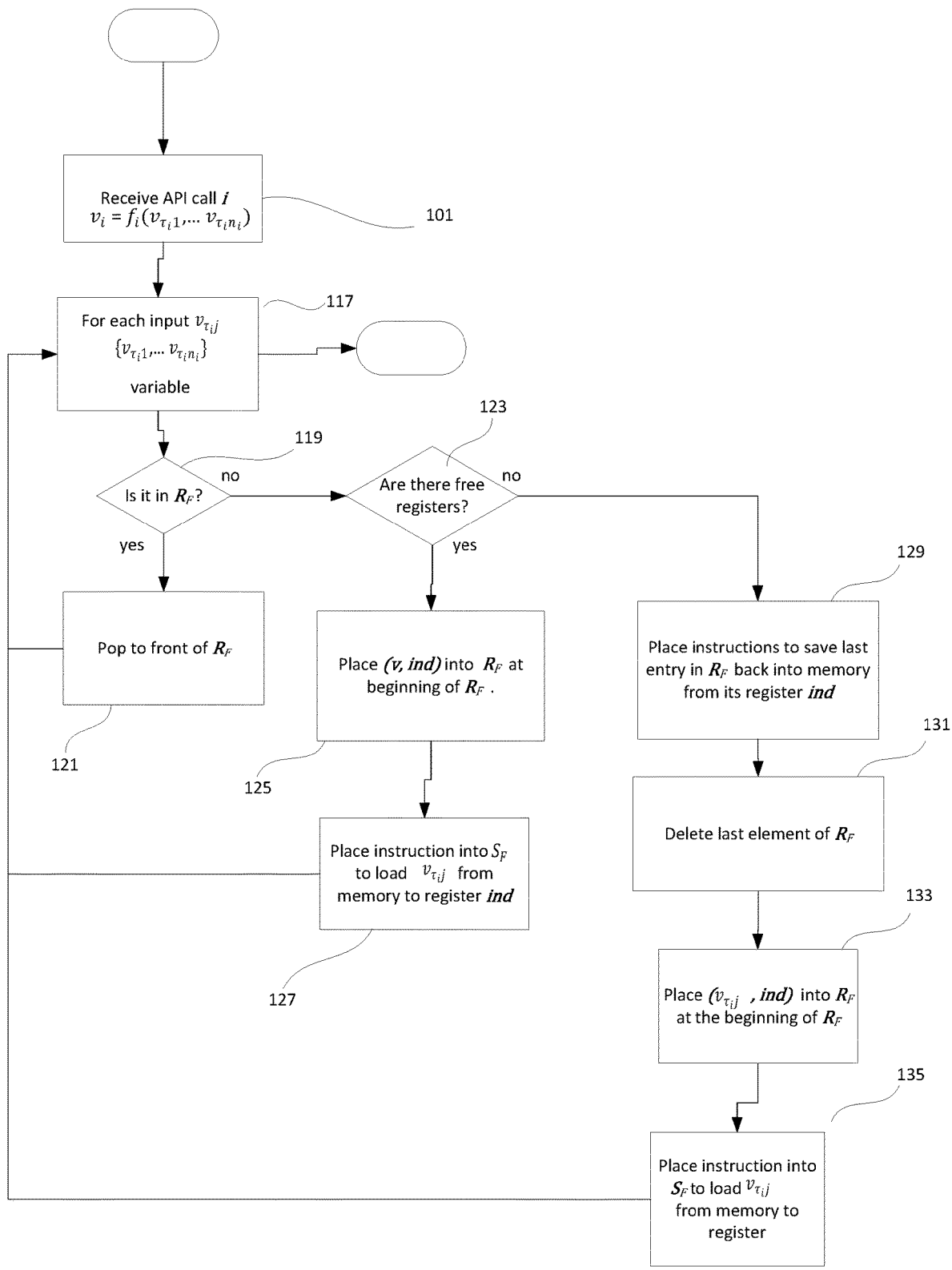
FIG. 7 is a flowchart describing the method of the forward register allocation module.

FIG. 7 shows an exemplary register allocation method implemented by the forward register allocation module 134. Its purpose is to write instructions into the compiled forward function 146 that allow loading and unloading of variables from the memory to the registers for processing. An auxiliary data structure $R_F$ is created to keep track of the correspondence between variables and their allocated registers. $R_F$ is initialised as an empty list and new items are placed into its beginning. $R_F$ keeps track of the memory to register allocation such that it can help prevent that a variable already allocated to a register is uploaded to a register again, or a variable is saved back from the register to the memory before this is necessary, thereby reducing the number of loads and unloads performed in the course of execution of the compiled forward function 146.

In step 101 the API call corresponding to a node in the LCM 100 is received. At step 117, a variable v from $v_{\tau_i 1}, \ldots v_{\tau_i n_i}$ is chosen in sequence to go through the register allocation process. That is each variable corresponding to a connected preceding node of the present node, or input to the function $f_i$ associated to the node of the LCM 100. Recall that the API call corresponding to the present node will contain this information.

In step 119 it is determined whether the variable v belongs to $R_F$. If it does belong to set $R_F$, the method proceeds to step 121 and the entry (v, ind) is popped to the top of the list $R_F$. If v does not belong to $R_F$, the method proceeds to step 123.

In step 123 it is determined whether there are any registers which have not been assigned to the any variables. That is the, the second components of (v, ind) are checked. If there are free registers available the method proceeds to step 125. If there are no free registers, the method proceeds to step 129.

In step 125 if there is a register available then then the pair (v, ind) where ind is an index of a free register, is placed into the beginning of $R_F$. In step 127, the instruction to load the variable v from its memory location to the allocated register ind is written into the forward function $S_F$. The instruction being appended to the end of $S_F$.

In step 129 it has been determined that there are no registers available which have not been allocated to a variable, therefore a variable needs to be removed from the registers to free up a register to which v can be allocated. The last entry (v', ind') in the list $R_F$, i.e. the register which would have been used least recently is selected. Instructions are written into the end of $S_F$ to save the variable v' from ind' back to its assigned location in memory. In step 131, that entry is deleted from the auxiliary data structure $R_F$. In step 133, the variable v is assigned to the now free register ind', so (v, ind') is placed into the beginning of the auxiliary data set $R_F$. In step 135, an instruction to load the variable v into the register ind' is placed into the forward set $S_F$ at the end of $S_F$.

The process then repeats for the next preceding connected node by returning to step 117. When all variables v for the API call i have been handled for that API call the work of the register allocation module is finished. The forward instruction module 136 then continues the method as described in FIG. 5.

Figure 8:
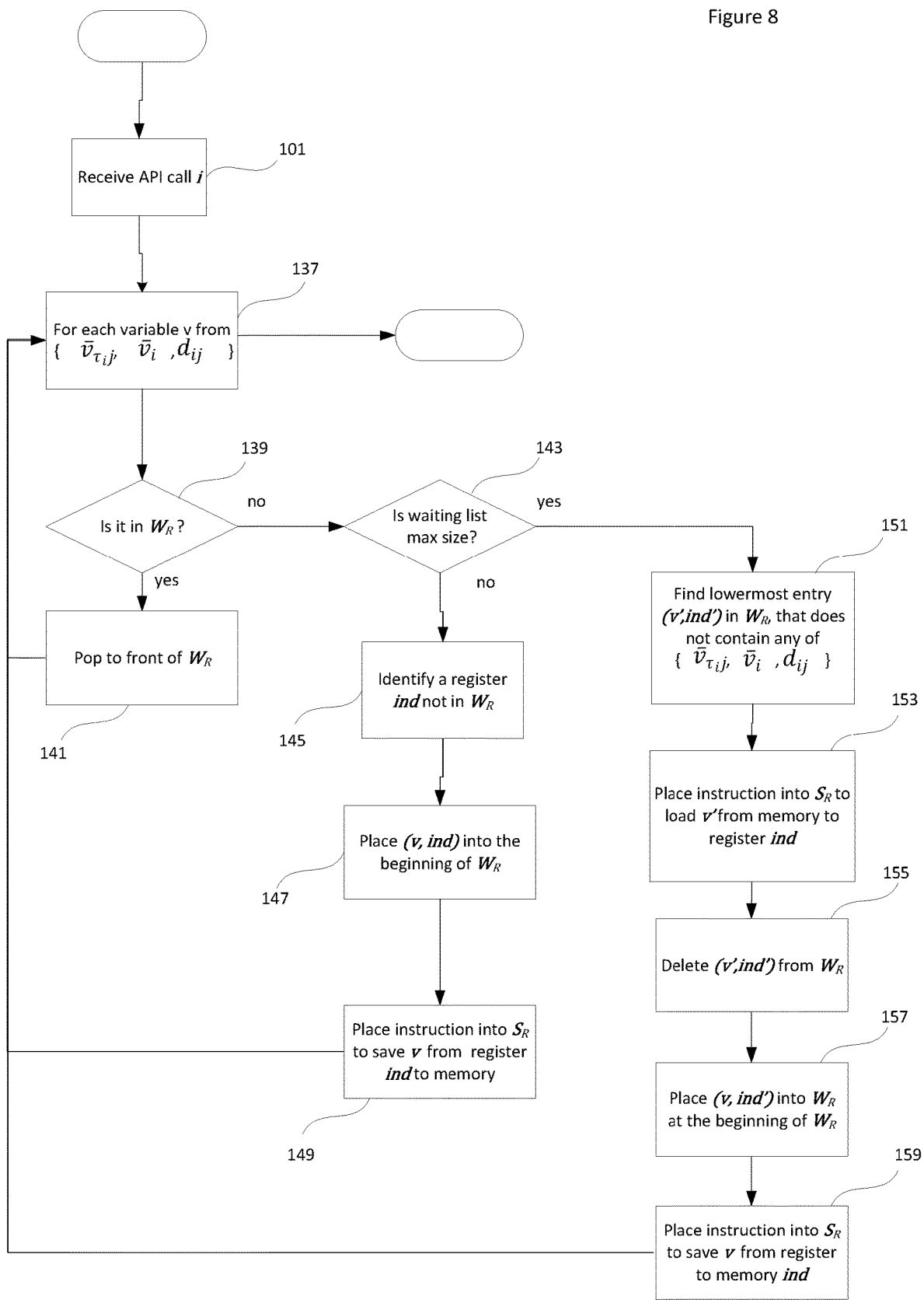
FIG. 8 is a flowchart describing a method of the reverse register allocation module.

FIG. 8 shows an exemplary register allocation method implemented by the reverse register allocation module 140. The set $S_R$ is formed from end to beginning. That is the set is constructed in the opposite direction to that in which it will be executed. The first instruction written to $S_R$ will be the last instruction executed later by the execution context 152. The process of register allocation for the reverse function is therefore rather different to the forward register allocation. An exemplary method is now described.

An auxiliary data structure or 'waiting list' $W_R$ is created and edited by the reverse register allocation module 140 which keeps a record of variables that are waiting for instructions to load them into registers. For each node of the LCM 100, the method described for performing the reverse function requires $\bar{v}_i$, $\bar{v}_{\tau_{ij}}$, $d_{ij}$, so all of these must be present in the registers when the instructions to implement the increment of the adjoint variable is made. Because the reverse function is written in the reverse order to that in which it will be executed the instructions written for register allocation in each node will be those that might save a variable that has just been processed by that node back into the memory.

In step 101 the API call corresponding to a node in the LCM 100 is received. At step 137, a variable v from $\bar{v}_i$, $\bar{v}_{\tau_{ij}}$, $d_{ij}$ is selected that has not yet been processed for this node. In step 139, for the variable v it is checked whether that variable belongs to the set $W_R$. If it does belong to set $W_R$ then the method proceeds to step 141. If it does belong to set $W_R$ then the method proceeds to step 143.

In step 141 then the entry (v, ind) is popped to the top of the list $W_R$.

In step 143, If the variable does not belongs to the set $W_R$, then it is determined whether the waiting list has reached its maximum size, which is reached when the number of elements of $W_R$ is equal to the number of registers in the CPU. If the waiting list has not reached its maximum size then the method proceeds to step 145. If the waiting list has reached its maximum size then the method proceeds to step 151.

In step 145, if the size of the waiting list is not maximum a free register ind is identified. In step 147, the pair (v, ind) is placed in the beginning of $W_R$ for some. In step 149. An instruction is written into the beginning of $S_R$ to save v from register ind to its memory location. The process is performed for the next variable.

In step 151 the last item (v', ind') of the waiting list is deleted, unless that item contains one of the variables $\bar{v}_i$, $\bar{v}_{\tau_{ij}}$, $d_{ij}$. If the last item contains one of $\bar{v}_i$, $\bar{v}_{\tau_{ij}}$, $d_{ij}$ then the previous item (v'', ind'') is deleted and so on until the condition is false. In step 153, the instruction to load (v', ind') from its memory location into the register is written into $S_R$ at the beginning of the set $S_R$. In step 155, the entry (v', ind') is deleted from $W_R$. In step 157, (v, ind') is placed into the waiting list at the beginning. In step 159, the instruction to save v from register ind' to its assigned memory location is formed and placed into $S_R$., as $d_{ij}$ is not edited by the reverse function is may not be necessary to save it back into memory as the value remains unchanged once calculate by the AAD algorithm. The reverse instruction writing module 142 then continues the method as described in FIG. 6, before the method proceeds to the next API call.

A footer of the compiled forward function 146 is formed after the final node of the LCM 100 has been processed. This may be triggered by a special API call signaling the end of the user's desired recording of the target function. Instructions to save any variables remaining in $R_F$ from the registers to the memory are appended to the forward set $S_F$.

A header of the compiled reverse function 148 can also be created at this stage. For any item (v, ind) in the auxiliary data structure $W_R$ write the instructions to upload the variable v into the register ind and add these to the beginning of the reverse set $S_R$.

The compiled forward function 146 and compiled reverse function 148 are saved into the function repository 124 from which they can be called by the module 130 as required by the user.

Although the preceding algorithm was described for the usual one double to one register CPU architecture the algorithm can be modified simply to extend the technique to make use of native CPU vectorisation techniques to implement Single Instruction Multiple Data, SIMD, implementations of the compiled forward function 146 and compiled reverse function 148.

The user input data can be grouped into chunks that correspond to the native CPU vector size and such that they can be processed together. The recording process of the compilation module 110 which creates the forward and reverse functions may automatically write vector instructions that operate on vector arguments. The instructions written by the compilation module may therefore be configured to operate on such vectorised instances of input data using native CPU vectorisation. Native CPU vectorisation may be provided by Advanced Vector Extensions, AVX, technology, so the computer code instructions formed by the compilation module may be AVX SIMD instructions. The instructions may be written so as to occupy a whole AVX register; which naturally share the same CPU instruction pointer, that is, the processor register which indicates where the computer is in its program sequence. The instructions may be written as 'mmType' variable types. mmType is a notional convention corresponding to _m256d in the case that AVX2 technology is being used for SIMD and to _m512d in the case of AVX512 being used for SIMD. These instructions can each act to process multiple instances of user data independently and simultaneously.

In the case where the user function comprises conditional operations, certain branches of the LCM 100 may not be accessed during the recording pass of the compilation module 110. This might require the user to rerecord the forward and reverse functions when new input variable values cause alternative branches of a computation map to be traversed. In the present disclosure, in fact, only a single recording of the user function is required. This is true even of the scenario where the single evaluation of the target function does not traverse in full the possible branches of the computational map because of choices made based on conditional operators. Any conditional operators that depend on static data are hard coded into the functions. Furthermore, the user, in the description of the target function or subprogram, converts all conditional branches that depend on active variables to indicator functions. API calls which implement such indicator functions are provided. For example, where an 'if' statement is required the user replaces this with the corresponding indicator functions call 'iIf':

```
Adouble A, x1, x2;
x1.markAsInput( ); x2.markAsInput( );
If (x1 > x2) {
    A = x1+1;
} else {
    A = x2 / 2;
},
```

-continued

```
may be converted to:
    Adouble A, x1, x2;
    x1.markAsInput( ); x2.markAsInput( );
    abool condition = x1 > x2);
    A = iIf(condition, x1+1, x2/2);
```

Here iIf takes an indicator condition of type abool as a first argument and forms instructions that assigns A to the first or second argument depending on the value of the condition. Thus the instructions formed and added to the compiled forward and/or reverse functions are configured to execute all branches that result from the conditional operator.

Often a user faces the situation in which an external function is provided for which source code may not be available, i.e. the functionality of the external function is realised by a third party "black box" library. In this case the user program can be augmented manually by the user to provide the derivatives of the external function by using any method, e.g. finite differences. The user would also need to ensure the multithread safety of the external function if needed. Any calculations run in between the calls to the external function can still be compiled as described with the provision of the additional data related to the external functions partial derivatives. The partial derivatives manually calculated by the user-provided method (e.g. finite differences) are passed to the execution module 130 (or execution context 152, see below) at the execution time of the compiled forward and reverse functions. The forward and reverse functions created by the compilation module will contain instructions to reference the user-provided method (which may be a function or subprogram of computer code) for calculating the derivatives of the external function. The user-provided function is compiled at the user program compile time and its address is obtained by the compilation module 110. Instructions to access this address are formed and written into the computer code instructions created by the compilation module 110 for the forward and reverse functions.

The natural realisation of the AD algorithm described, with reference to Algorithm 2, has the differentials calculated during the forward pass and further used by the reverse function. The strict adherence to this plan can lead to a run-time stack overhead. Checkpointing is a technique that can be used to alleviate such a problem. A checkpoint is either a full or partial record of the program state at a particular point of execution. The described AAD compiler is fully compatible with checkpointing techniques. The checkpoint may be thought of as an example or extension of the idea of 'intermediate data' created for use by the compiled forward function 146 or compiled reverse function 148.

Figure 9:
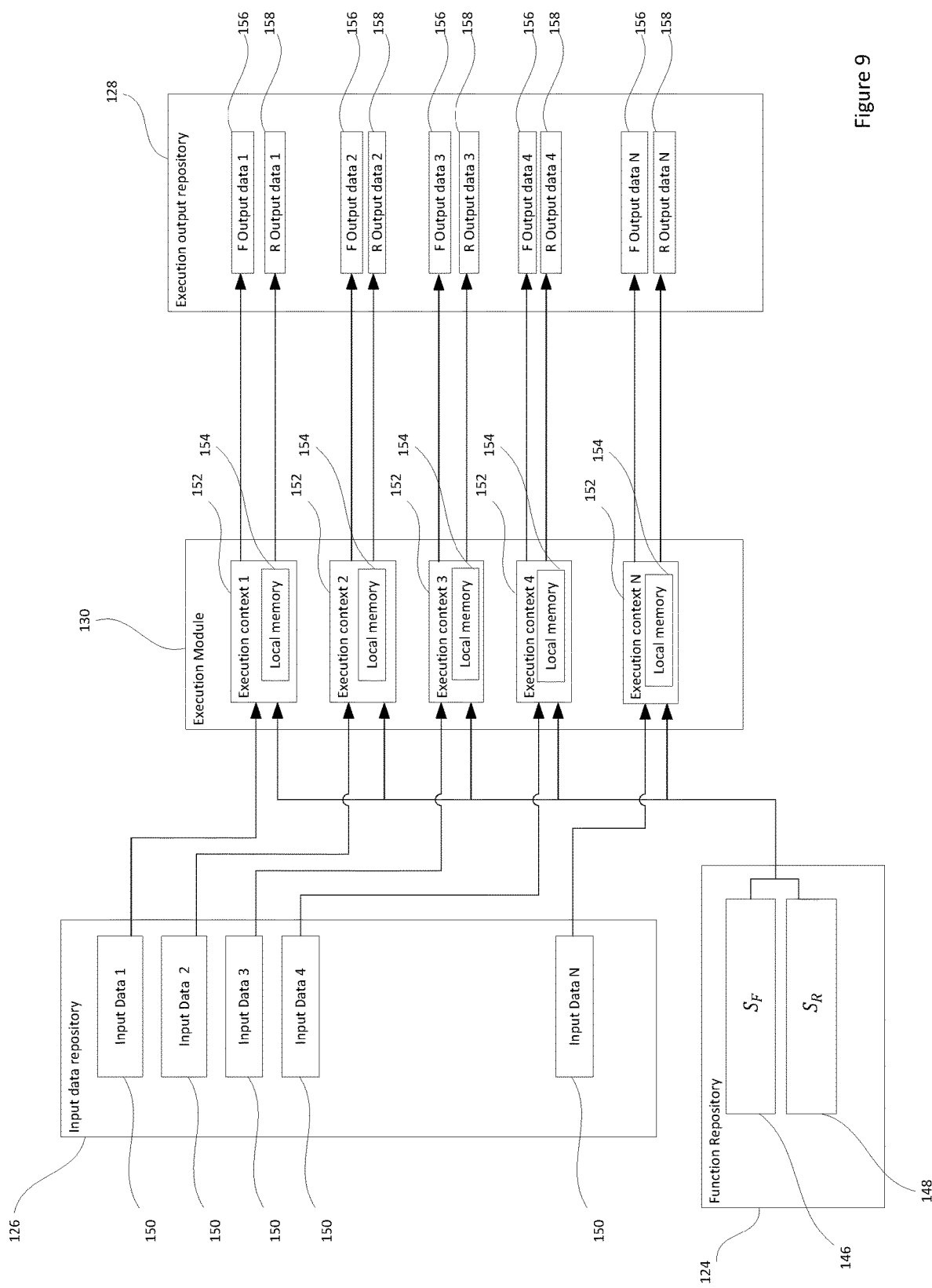
FIG. 9 is a functional module diagram of a computer configured to execute the compiled forward and reverse functions.

FIG. 9 shows an execution module 130 configured to execute the compiled forward function 146 and compiled reverse function 148 for multiple sets of input data 150 in parallel. The execution module 130 receives the compiled forward function 146 and compiled reverse functions 148 from the function repository 124 and also receives input data 150 from the input data repository 126. The execution module 130 then applies the compiled forward function 146 and reverse function 148 to the input data 150 taken from the input data repository 126 and outputs the result or results of this to the execution output repository 128 which is configured to store the output data 156 158.

The execution module 130 itself can be divided into one or more execution contexts 152. An execution context 152 comprises its own segregated local memory 154 accessed only by the compiled forward function 146 and compiled reverse function 148 executed within this execution context 152. Within the execution context 152, the compiled forward function 146 and compiled reverse function 148 may be operated on an instance or instances of input data. All intermediate data produced or altered during the run of the forward and reverse functions in the execution context 152 can be saved in memory within the local memory 154 of the execution context 152.

The intermediate data produced during the execution of the compiled forward function 146 are stored in a local memory 154 assigned to each execution context 152. Recall, the compiled forward function 146 and compiled reverse function 148 contain all the static data of the target function so the local memory 154 is not required to store this data. The local memory 154 only shares data between the compiled forward function 146 and compiled reverse function 148 within an execution context 152. A plurality of execution contexts 152 existing simultaneously thus allows for safe multi-threading.

Multithread safety of the forward and reverse functions is guaranteed, even if the user's original target function was not itself multithread safe. The compiled function code remains immutable once the compilation module 110 has built it. The function is the same for every different set of input variables. Multithread safety is guaranteed as all static data is captured within the instruction sets for the compiled forward and reverse functions and the compiled forward and reverse functions are completely segregated from the user program stored in the code repository 122.

The forward function receives the input data from the input data repository 126 and is executed. The input data may be values for the marked input variables of the target function. The execution context 152 is in a state, which is to say it contains data saved in the local memory 154, after execution of the forward function. The reverse function is then executed which takes inputs from and updates information in the local memory 154 during the course of execution. Where there are multiple dependent variables for which a user desires derivatives, after the forward function is performed for a set of input variables the intermediate variables required for the reverse function to calculate these derivatives for each dependent exist in the local memory after a single execution of the forward function. Therefore, it is advantageous to execute the compiled forward function only once for a given set of input variables, and proceed with multiple executions of the reverse function for those input variables, each execution of the reverse function comprising the step of reinitialising the adjoint variables associated with the result nodes of the LCM 100 to be 0 everywhere except the dependent variable of interest for that execution.

Figure 10:
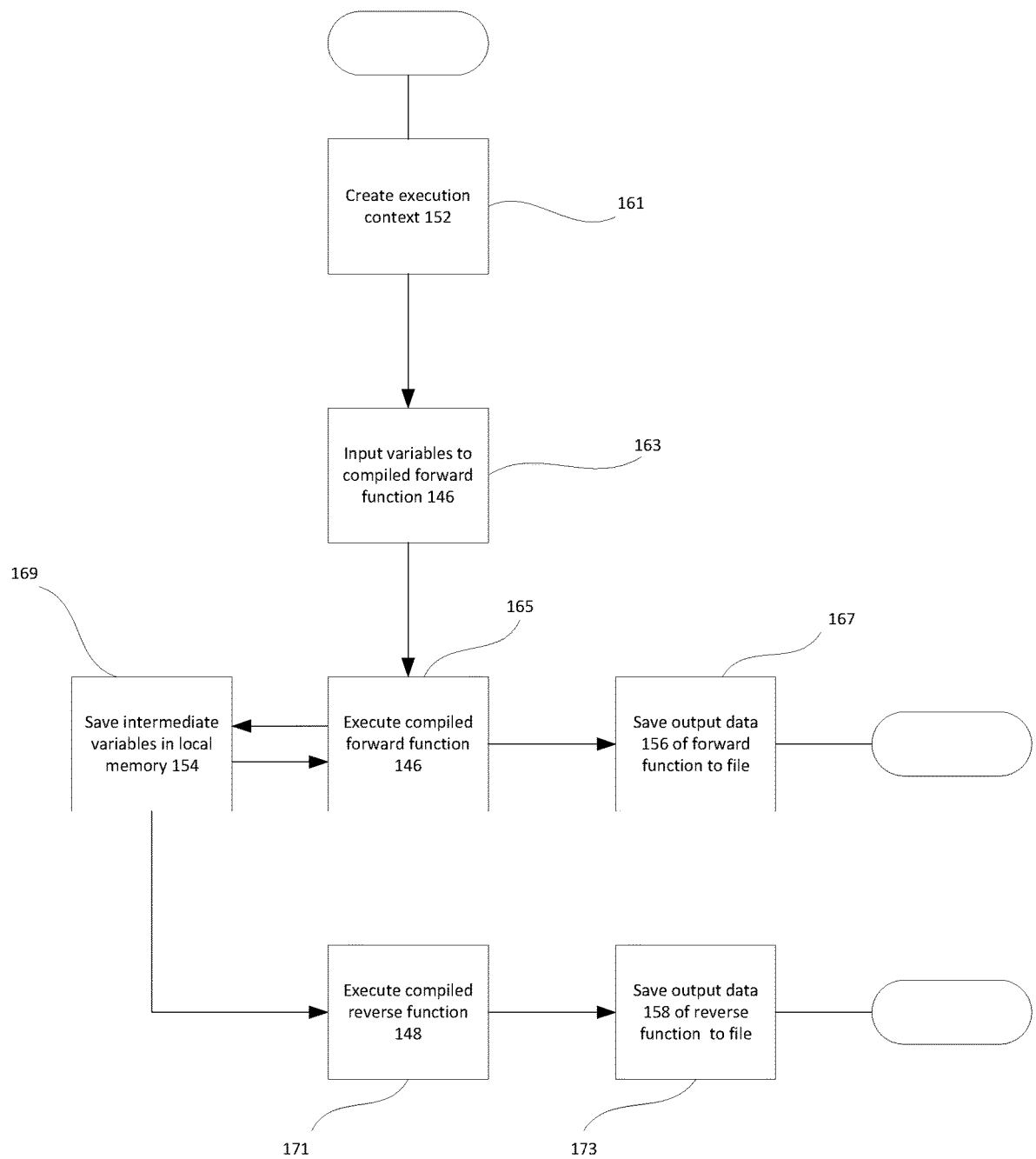
FIG. 10 is a flowchart describing the method of the executing the forward and reverse functions.

FIG. 10 illustrates the method implemented by a single execution context 152. A single execution context 152 comprises a specific set of input variables for the target function, access to or a copy of the compiled forward function 146 and compiled reverse function 148 and a local memory 154 to which intermediate data accumulated during execution of the forward function are saved.

In step 161, the user pre-allocates an execution context 152 before execution of the forward and reverse functions by specifying the input data and initialising a segregated workspace by means of an API call.

In step 163, the input variables for which the user wishes to evaluate the target function or its derivatives are passed to the compiled forward function 146 and compiled reverse function 148 from the input data repository 126.

The user allocates execution context 152 and schedules multithreaded execution of input data. Each execution context 152 processes a single input data sample at any one time. The execution contexts 152 can operate in parallel as the forward and reverses functions do not contain any volatile data. There is no competition between execution contexts 152 for static data as this is hard coded into the forward and reverse functions.

In step 165, the compiled forward function is then executed on the input variables.

In step 169, any intermediate data stored by the forward function that will be required for the execution of the reverse function are stored in the local memory 154 of the execution context 152. The adjoint variables are also initialized for each node and stored in the local memory 154.

There may be an output of the forward function to the execution output repository 128, for example, the evaluation of the target function for the input variables. This is saved to the execution output repository 128 in step 167. Some or all of the intermediate data may also be provided to the execution output repository 128 if a user is interested in knowing this data, or requires it to facilitate further calculation or analysis.

After executing the forward function, the intermediate data necessary for the execution of the reverse function exists in the local memory 154 of the execution context 152 and so the reverse function can be executed within that execution context 152.

In step 171, the reverse function executed. The reverse function is passed the intermediate data and the initialized adjoint variables from the local memory 154 and uses these to update the adjoint variables according to an automatic adjoint differentiation algorithm, for example, the one described in relation to Algorithm 2 and FIGS. 5 and 6.

In step 171, after execution of the reverse function, the derivatives of the target function with respect to the desired input variables are provided. These can be output and/or saved at the execution output repository 128.

To reuse an execution context 152 for a new set of input variables the adjoint variables are reinitialised between executions of different input data samples and the method can return to step 163.

The method and system described in relation to producing a compiled forward function 146 and compiled reverse function 148 according to an automatic adjoint differentiation algorithm can also provide advantages when the user is not interested in calculating derivatives of a target function. The desirable properties of: producing code directly executable on a CPU; providing multithread safety even when the user's function was not itself multithread safe; automatically vectorising the function for SIMD, among others, are useful even when a user is simply wishing to speed up multiple evaluations of the target function itself, and has no interest in derivatives. Thus, the present disclosure also describes a technique to produce computer code describing a compiled function by writing a user target function in directly executable binary object code, or similar, at runtime by an operator overloading technique. For consistency, we will refer to such a function as a forward function as before, as the execution flow of the compiled function will match that of the initial user function.

The system and method in respect of this second embodiment can be readily understood with reference to the first embodiment. It will be apparent that features described in relation to one or both embodiments are compatible and can be combined.

Figure 11:
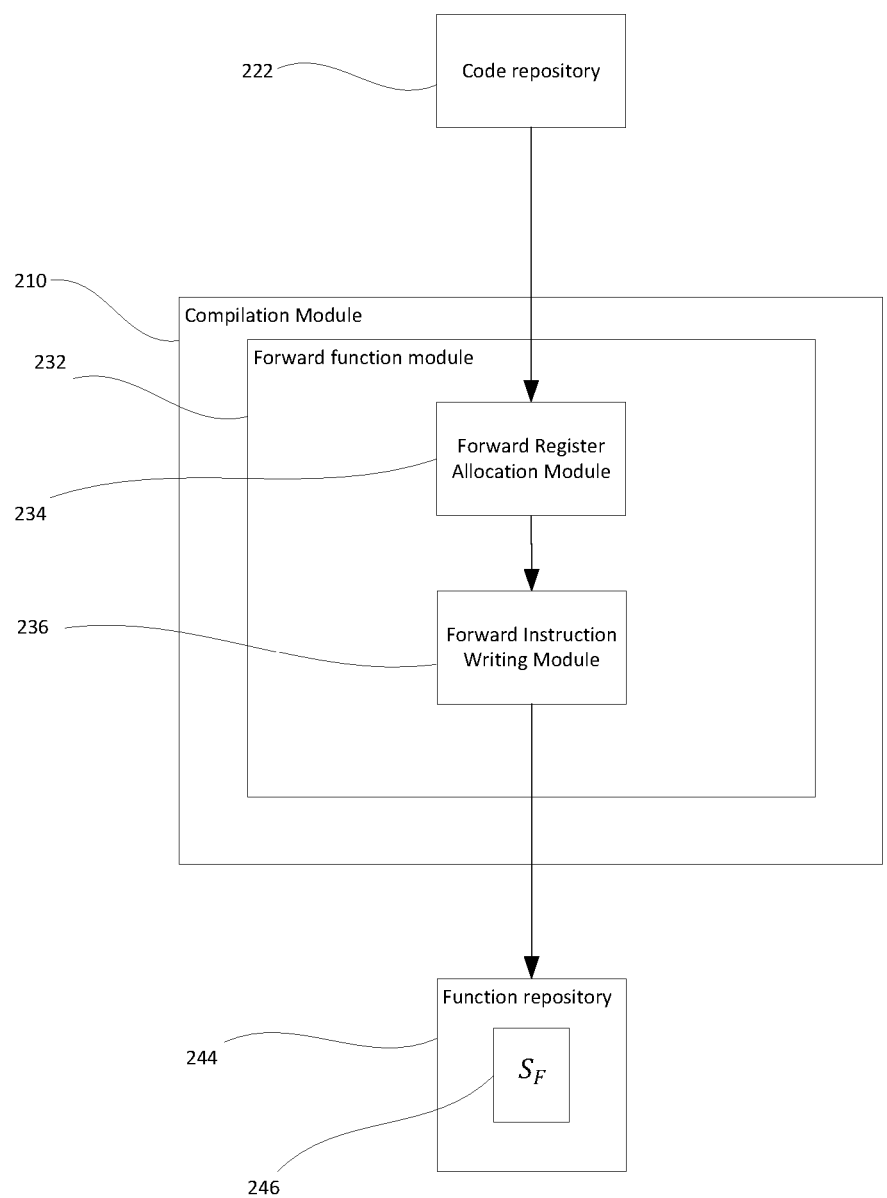
FIG. 11 is a functional module diagram of the compiler module according to a second embodiment.

FIG. 11 shows in more detail a compilation module 210 configured to compile a forward function which is configured to evaluate the target function. Such a forward function is described in FIG. 1, Table 1 and Algorithm 1. Similarly to the compilation module 110 according to the first embodiment the compilation module 210 comprises a forward function module 232, however there is no reverse function module 138. The forward function module 232 comprises a forward register allocation module 234 and a forward instruction module 236. The output of the forward function module 232 is written in the function repository 224.

Figure 12:
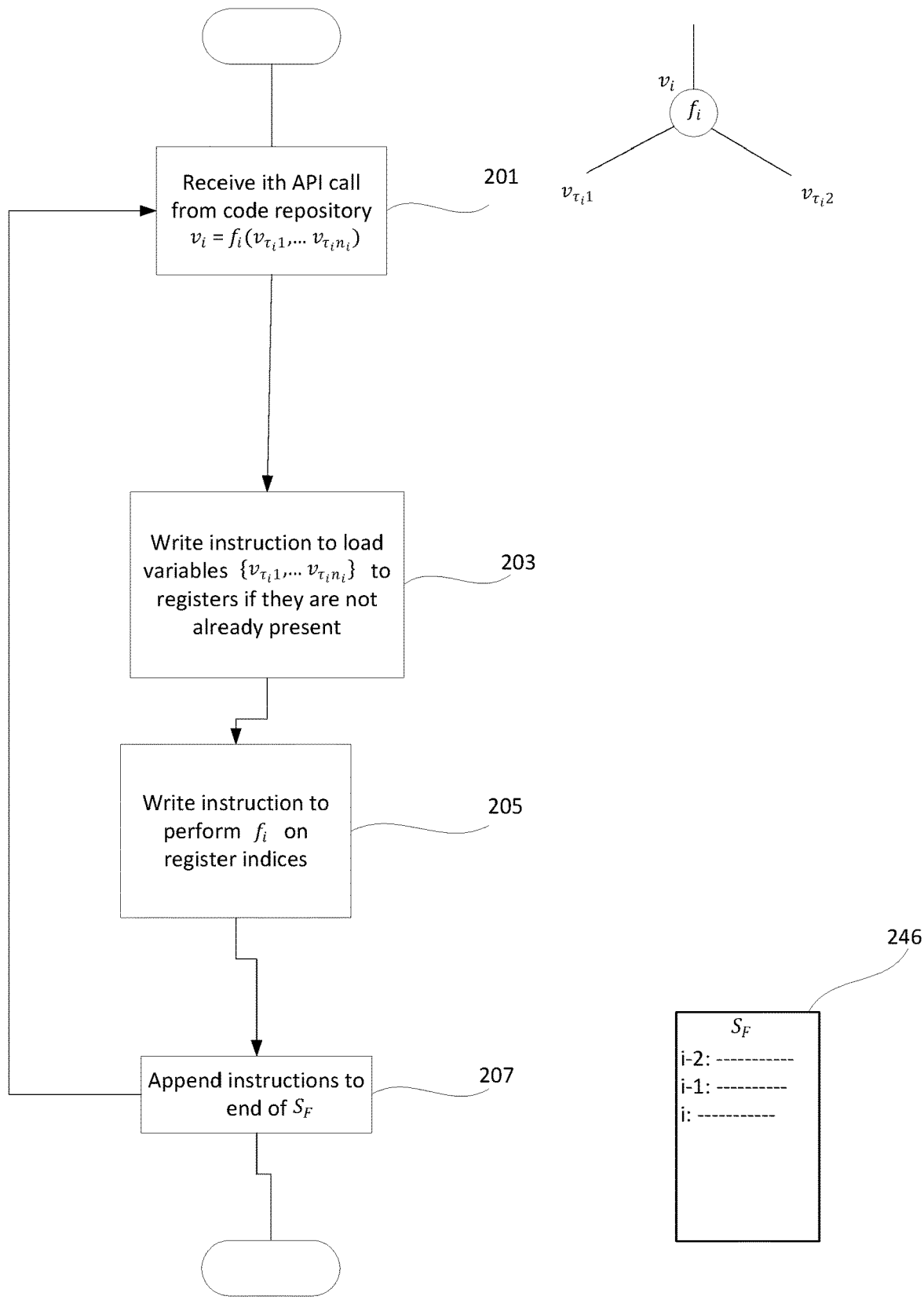
FIG. 12 is a flowchart describing the method of the forward function module of a compilation module according to a second embodiment.

FIG. 12 illustrates the method performed by the forward function module 232 of FIG. 11. The method is similar to that performed in FIG. 5, with step 107 omitted. The user evaluates the target function for some arbitrary choice of input 'active' variables. The elementary operations are overloaded such that the evaluation of the target function on active type input variables calls the API methods which will write computer instructions configured to evaluate a forward function.

At step 201 the forward function module 232 receives API call i that implements a node of the computational map of the target function for active variables. This comprises information on the node index i; indices of the nodes which are inputs to node i; and, the function $f_i$.

In step 203 the register allocation module checks if the variables are present in the registers and if not, writes the instruction the load and unload variables to registers such that all required for the operation $f_i$ are present. These instructions are appended to $S_F$. In step 207, the instruction to perform $f_i$ on the variables in the appropriate registers is then appended to $S_F$. This is repeated for each node in the linearized computational map 100.

The allocation of registers to variables can be achieved with the same method as that described in the FIG. 7, although it will be appreciated that the partial derivatives may not be required to play a role in replicating the evaluation of the target function. The footer is formed in a similar manner to that described for $S_F$ in the full AAD case.

The compiled forward 246 function is completely segregated from the user program. The forward function has all user data encapsulated and its memory state is limited to vectors $v_i$, which may be stored in the local memory 154.

Figure 13:
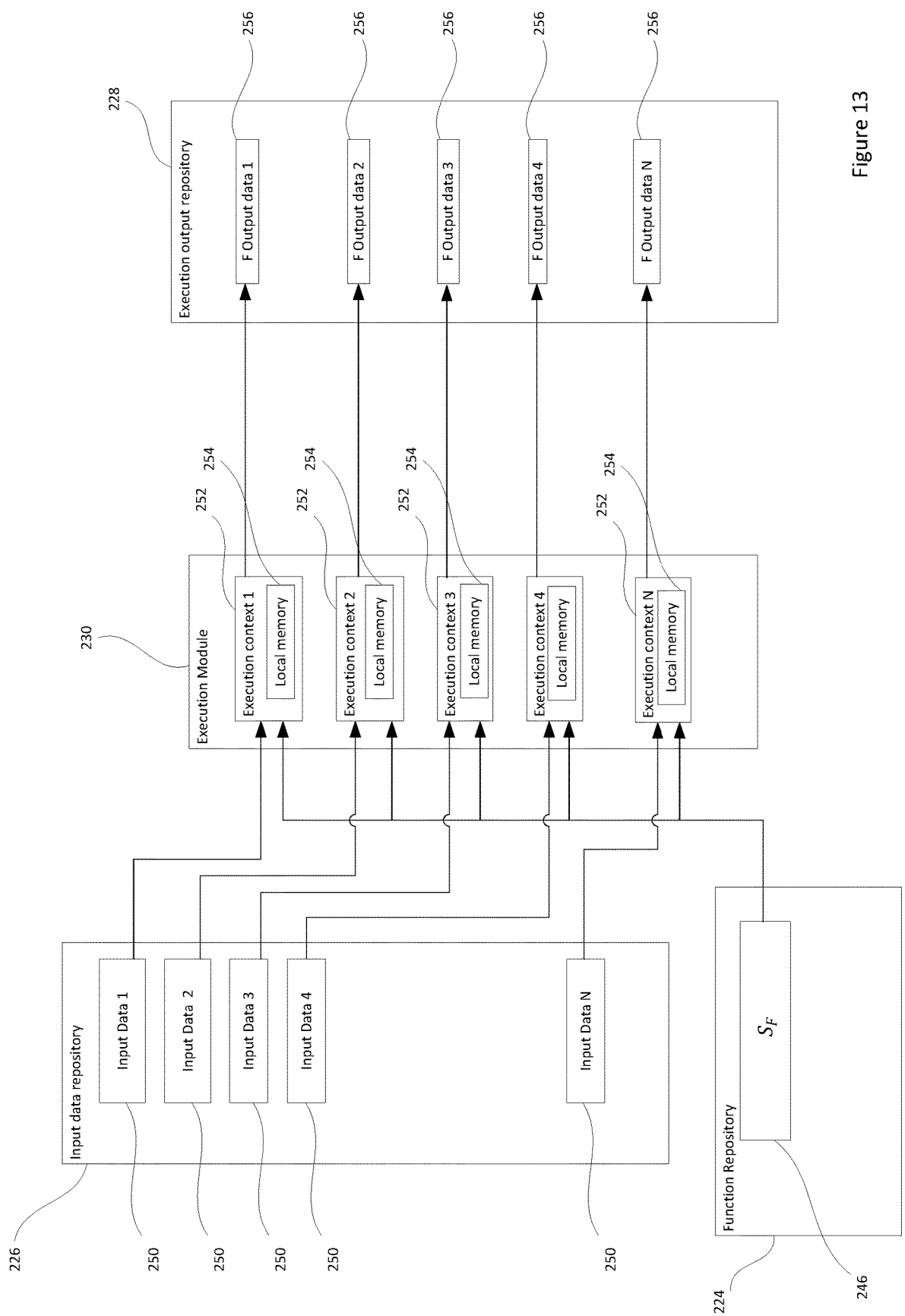
FIG. 13 is a functional module diagram of a computer configured to execute a compiled forward function according to the second embodiment.

FIG. 13 shows the execution module 230 receiving input data from a database, the forward function from the function repository 224 and outputting the results to the execution output module in safe multithreading mode.

Figure 14:
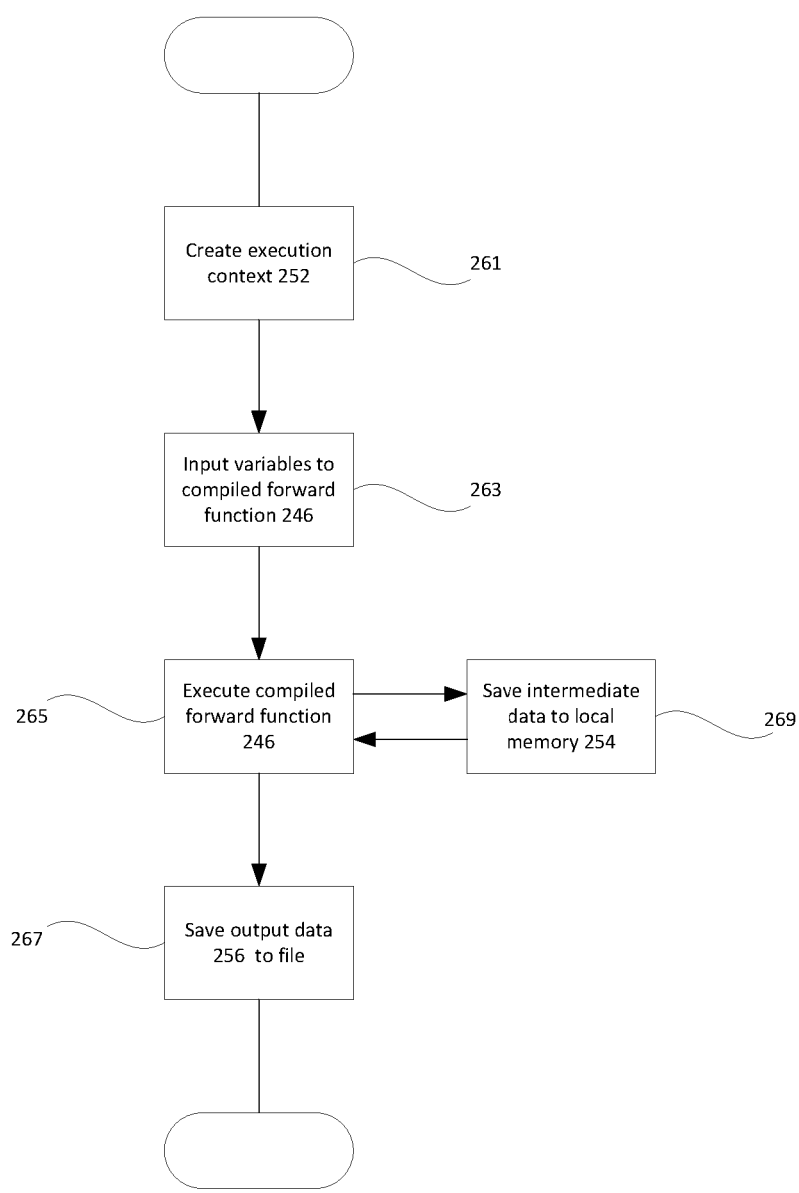
FIG. 14 is a flowchart describing the method of the executing the forward function according to the second embodiment.

FIG. 14 describes the method implemented by the execution module 230, similarly to FIG. 10 for the AAD case.

In step 261, the user pre-allocates an execution context 152 before execution of the forward function by specifying the input data and initialising a segregated workspace by means of an API call.

In step 263, the input variables for which the user wishes to evaluate the target function or its derivatives are passed to the compiled forward function 246 from the input data repository 226.

The user allocates execution context 152 and schedules multithreaded execution of input data. Each execution context 152 processes a single input data sample at any one time. The execution contexts 152 can operate in parallel as the forward function does not contain any volatile data. There is no competition between execution contexts 152 for static data as this is hardcoded into the forward function.

In step 265, the forward function is then executed on the input variables.

In step 269, any intermediate data created by the forward function are stored in the local memory 154 of the execution context 152. The forward function can load and unload intermediate variables from the local memory 154.

In step 267 the output of the forward function, that is the values of $(y_1, \ldots, y_m) = F(x_1, x_2, \ldots, x_n)$, is saved to the execution output repository 128. Some or all of the intermediate data may also be provided to the execution output repository 128 if a user is interested in knowing this data, or requires it to facilitate further calculation or analysis.

It will be appreciated from the discussion above that the embodiments shown in the Figures are merely exemplary, and include features which may be generalised, removed or replaced as described herein and as set out in the claims. With reference to the drawings in general, it will be appreciated that schematic functional block diagrams are used to indicate functionality of systems and apparatus described herein. For example the functionality provided by the code repository 122 may in whole or in part be provided by a processor having one more data values stored on-chip. In addition the processing functionality may also be provided by devices which are supported by an electronic device. It will be appreciated however that the functionality need not be divided in this way, and should not be taken to imply any particular structure of hardware other than that described and claimed below. The function of one or more of the elements shown in the drawings may be further subdivided, and/or distributed throughout apparatus of the disclosure. In some embodiments the function of one or more elements shown in the drawings may be integrated into a single functional unit.

The above embodiments are to be understood as illustrative examples. Further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

In some examples, one or more memory elements can store data and/or program instructions used to implement the operations described herein. Embodiments of the disclosure provide tangible, non-transitory storage media comprising program instructions operable to program a processor to perform any one or more of the methods described and/or claimed herein and/or to provide data processing apparatus as described and/or claimed herein.

Certain features of the methods described herein may be implemented in hardware, and one or more functions of the apparatus may be implemented in method steps. It will also be appreciated in the context of the present disclosure that the methods described herein need not be performed in the order in which they are described, nor necessarily in the order in which they are depicted in the drawings. Accordingly, aspects of the disclosure which are described with reference to products or apparatus are also intended to be implemented as methods and vice versa. The methods described herein may be implemented in computer programs, or in hardware or in any combination thereof. Computer programs include software, middleware, firmware, and any combination thereof. Such programs may be provided as signals or network messages and may be recorded on computer readable media such as tangible computer readable media which may store the computer programs in non-transitory form. Hardware includes computers, handheld devices, programmable processors, general purpose processors, application specific integrated circuits, ASICs, field programmable gate arrays, FPGAs, and arrays of logic gates. The techniques described may be particularly advantageously applied to models and simulations of complex systems; complex systems comprising systems composed of many components or parameters which interact with each other whose behavior may be difficult to model or predict due to the interactions and dependencies of the constituents components. Examples may include, the Earth's climate system; biological systems; infrastructures such as power grids; transportation or communication systems etc. The techniques described may be used advantageously in numerous other fields, such as; risk management, financial services, computational fluid dynamics and more generally in fields where minimisation of mathematical functions and calculations of derivatives, sensitivities, 'Greeks' and the like are advantageously employed.

Other examples and variations of the disclosure will be apparent to the skilled addressee in the context of the present disclosure.

A 'linearised computational map', or LCM, may comprise a plurality of nodes connected by a plurality of edges. Each node of the LCM may be connected to one or more other nodes by a respective one or more edges. Each node may comprise a processing function to be performed on data at that node. Each edge may enable a flow of information between different nodes of the LCM.

Methods of the present disclosure may comprise, for an initialization node (e.g. a first node), forming computer code instructions for computing intermediate data associated with a forward function of the automatic adjoint differentiation algorithm, for example, instructions to assign the input variables to program variables. Instructions may also be formed to initialise the adjoint variables. Then, for a subsequent node which is connected to the first node, methods may comprise forming computer code instructions for computing intermediate data associated with the forward function of the automatic adjoint differentiation algorithm, and incrementing, according to the automatic adjoint differentiation algorithm, adjoint variables of the first node. Methods may also comprise forming instructions to assign input variables to program variables at a/the subsequent node or further initialization nodes (since there may be multiple input variables). Methods may comprise performing these same steps (forming computer code instructions for computing intermediate data for that node and for incrementing adjoint variables for preceding nodes) for subsequent nodes which are higher in the computational graph. Methods may comprise iterating these steps for all connected nodes in the graph until, the steps have also been performed for a result node (e.g. a final node, which may be a highest connected node) in the computational graph.

An LCM may comprise a map describing the order of evaluation of the elementary operation and/or the execution flow of a function or program. The nodes of the map may correspond to the elementary operations and the edges of the map may indicate the flow of information between them. For example, embodiments of the present disclosure may comprise determining an LCM based on a target function. Such a determined LCM may provide an arrangement of nodes and edges to describe an order of evaluation for an elementary operation of the target function and/or the execution flow of the target function.

A computational map may be linearized in the sense that it may satisfy one or more of the following requirements:

each assignment statement has a different variable on the left-hand side (for example the LCM may comprise a version of the target function in which all assignment statements assign a value to a different variable from the other assignment statements of the LCM); all loops are unrolled; all procedure calls are inline; conditional statements that depend on static data are taken once; conditional statements that depend on input variables are handled using indicator functions; only instructions which perform elementary operations are used, these instructions may be those with a straightforward analogue as processor intrinsic functions.

Embodiments of the present disclosure may comprise computing intermediate data associated with a forward function of an automatic adjoint differentiation algorithm. Intermediate data may comprise data first created by a said forward function which is then preserved for use by a reverse function. It is to be appreciated in the context of the present disclosure that such intermediate data may comprise any data (e.g. information) which can be used by a said reverse function to enable determination of the adjoint variables (e.g. any data which may be used to make the calculations necessary to determine the adjoint variables). Intermediate data may comprise one or more partial derivatives of the operations associated with the target function. For example, for each node of a LCM, intermediate data may comprise partial derivatives associated with that node (e.g. derivatives with respect to input variables to that node). Intermediate data may also comprise an indication of the value of the target function as evaluated at a selected node.

Static data may comprise data which does not depend on the marked user input variables (e.g. it may be data which does not change after being recorded). Static data may comprise any intermediate data that does not depend on the marked input variables. Static data may comprise data which may not be 'constant' or 'static' in the context of the original target function or program, but may comprise data that can be hardcoded in the created forward and reverse functions since is does not depend on marked input variables (e.g. the variables which the user is not sweeping over when the forward and reverse functions are called) and so will not change when the user is sweeping over the marked input variables. Static data may comprise data produced by the execution of the user function or any compiled functions.

The methods described throughout may enable a reduction in the overhead associated with producing computer code for automatic adjoint differentiation and/or for replicating a target function by providing the code directly without the need for additional runtime compiling. Embodiments of the present disclosure may enable the computer code instructions to be produced as a stream (e.g. the instructions for the forward and reverse functions can be created in parallel). This may enable instructions to be produced at runtime, and so the compiler associated with the high-level programming language in which the original program is written (or any other high-level programming language compiler) is not invoked to produce the computer code instructions. The proposed methods therefore strip out the overheads of runtime compilation of the code by the compiler of the high-level computing language which may be resource intensive. For example, methods of the present disclosure may avoid the need for use of all memory allocations, virtual tables and function calls associated with runtime compilation of code by the compiler of a high-level computing language. In a further example, for multithreading, methods of the present disclosure may also improve performance by avoiding the use of mutex (which may otherwise be required for compile time implementation of multithreading). The method of forming computer code instructions described herein enables substantial speed ups by avoiding these substantial overheads. Embodiments may therefore enable increased computational efficiency for providing computer code instructions and/or enable increases in speed for providing computer code instructions.

The methods described may also provide an improvement to operator overloading techniques, which are typically difficult to optimize at compile time. The present disclosure describes methods of utilising operator overloading in which optimised computer code is produced by the overloaded operators at runtime. Examples of the such optimisations in the present disclosure include: forming computer code instructions configured to operate on vectorised instances of input data using native CPU vectorisation; hardcoding static data into the computer code instructions, and/or providing a copy of such static data isolated from the original user program (i.e. in the static data repository); and, forming computer code instructions to define an optimized memory to register allocation. The methods may be suitable for use in any object oriented language. They may be particularly suitable to automatic adjoint differentiation techniques.

The methods described also provide a method of forming computing code instructions that includes optimisations, for example, vectorisation and multi-threading, which is more flexible and simpler to implement for a user. The user is able to simply provide a target function/program as an input to the compiler without having to make any substantial changes to their computer code. This reduces the need for significant software engineering expertise on the part of the user. This may also reduce the 'brittleness' of the resulting computer code and facilitate sustainable development of the user's program(s), since only minimal changes are required to the user code. 'Brittleness' might usually be partially overcome with extensive refactoring of the code. However, refactoring requires substantial work by highly skilled software engineers, and does not entirely alleviate the problem—some brittleness in the code will remain—whereas the presently disclosed methods prevent the introduction of 'brittleness' in the first place. In addition, existing methods of introducing optimisations such as multi-threading and vectorisation, introduce these optimisations into the machine code at compile time, whereas according to the presently disclosed methods this may be achieved at runtime. This allows the optimisations to be introduced without substantial changes to the user code. The methods may also be used to implement other examples of computer code optimisations or future technological optimisations that would otherwise require compile time implementation in a human readable language by a software developer with extensive experience.

Benchmarking Data

Benchmarking data supports that the methods according to the present disclosure provide substantial improvements in performance over existing methods.

Relative Time

Table 4 demonstrates the relative time taken by the presently disclosed Automatic Adjoint Differentiation Compiler (AADC) to calculate a full gradient (using automatic adjoint differentiation) of a target function/program, expressed as a percentage of the execution time of the original user function/program. Three models are used for comparison: Toon, LIBOR Market Model (LMM) and XVA (Credit/Debit Valuation Adjustments). The comparison is made for both AVX2 and AVX512 vectorisations. In order to assess the effect of vectorisation and code generation separately, AVX2 results are scaled by estimated vectorisation speedup factor of 3.2 to get to obtain the scalar (i.e. non-vectorised) timing.

The Toon benchmark is programmatically very simple and already well optimized. For more involved user programs that express mathematical calculations in object oriented languages, higher performance gains are normally observed—as demonstrated by the XVA benchmark.

TABLE 4

| Model Name | AVX2 | AVX512 | Scalar | State of the art |
|---|---|---|---|---|
| Toon | 39% | 36% | 125% | 270% |
| LMM | 35% | 21% | 112% | N/A |
| XVA | 39% | 21% | 124% | 470% |

Forward Only Benchmark

AADC was applied to an open source XVA system which closely replicates production systems used in practice. AADC was used to replicate the execution of a target function/program (i.e. not performing an adjoint differentiation). A factor of 150 speed up was observed for calculating XVA pricing of a large portfolio of financial instruments (interest rate swaps and swaptions) using only AVX2 vectorisation and being run on a single CPU core (i.e. without multi-threading).

Comparing AADC to Currently Available Industry Standard Tools

AADC was compared with other automatic adjoint differentiation tools using the results published in Srajer, F., Kukelova, Z., and Fitzgibbon, A. 2018. *A benchmark of selected algorithmic differentiation tools on some problems in computer vision and machine learning*, Optimization Methods and Software 33(4-6), 889-906. This paper assessed a multitude of automatic adjoint differentiation tools using a Gaussian Mixture Model (GMM). Table 5 shows the absolute time required by each tool to calculate adjoints for a GMM in this paper.

TABLE 5

| Tool | Language | Absolute time (seconds) for problem of 5.36e+4 variables | Absolute time (seconds) for problem of 4.29e+5 variables |
|---|---|---|---|
| Manual | | 3.89e+2 | 6.16e+3 |
| Adept | C++ | 4.09e+3 | 3.99e+4 |
| Tapenade | C | 1.32e+3 | 1.59e+4 |
| ADOLC | C++ | 1.04e+4 | Timed out |
| Finite Difference | | Timed out | Timed out |
| Ceres | C++ | Timed out | Timed out |
| DiffSharp | F# | Timed out | Timed out |
| Autograd | Python | Timed out | Timed out |
| Julia-F | Julia | Timed out | Timed out |
| Julia-F (vect) | Julia | Crashed | Crashed |
| Theano | Python | Crashed | Crashed |
| Theano (vect) | Python | Crashed | Crashed |
| MuPAD | Matlab | Crashed | Crashed |

*Timed out indicates that the task was not completed within a set cut-off period.

Table 6 shows a GMM benchmark for the presently disclosed AADC tool for a problem with 4.29e+5 variables, using both AVX2 and AVX512 vectorisations and a single CPU core. Note that the timing was adjusted to compensate for different hardware used to run these benchmarks as compared with those in Table 5.

TABLE 6

| Tool | Language | AVX2 | AVX512 |
|---|---|---|---|
| AADC | N/A | 1.79e+3 | 1.61e+3 |

Memory

Table 7 shows memory benchmarks produced using the conventional LW, Toon and GMM tests which compare the Adept tool and the presently disclosed methods.

TABLE 7

| Tool | LW | Toon | GMM |
|---|---|---|---|
| Adept | 3 MB | 24.5 MB | 23 MB |
| AADC | 42 kB | 11.5 MB | 7 MB |

The invention claimed is:
1. A computer implemented method for operating on a target function to provide computer code instructions configured to implement automatic adjoint differentiation of the target function, the method comprising:
   determining, based on the target function, a linearized computational map (100), LCM, of the target function wherein each node of the LCM (100) comprises an elementary operation;
   defining an active data type;
   for each node of the LCM (100) forming computer code instructions by providing overloaded operators for the elementary operations wherein the output of the overloaded operators enacted on an active data type variable comprises computer code instructions configured to:
      (i) compute intermediate data associated with a forward function of an automatic adjoint differentiation algorithm; and,
      (ii) increment, according to the automatic adjoint differentiation algorithm, adjoint variables of the pre- ceding connected nodes of the each node in dependence on intermediate data;
wherein forming computer code instructions for both step (i) and step (ii) for each node is performed prior to performing said steps for a subsequent node of the LCM (100).

2. The method according to claim 1 further comprising hardcoding data which does not depend on a marked user input variable into the instructions.

3. A computer implemented method for operating on a target function to provide computer code instructions configured to implement the target function, the method comprising
defining an active data type;
evaluating the target function using active data type variables;
determining, based on the target function, a linearized computational map (100), LCM, of the target function wherein each node of the LCM (100) comprises an elementary operation;
providing overloaded operators for the elementary operations wherein the output of the overloaded operator enacted on an active data type variable comprises computer code instructions to evaluate the elementary operation of the overloaded operator; and,
hardcoding data which does not depend on a marked user input variable into the computer code instructions output by the overloaded operators.

4. The method according to claim 1 wherein the instructions are written in computer code configured to be executed directly by a CPU wherein the computer code is binary object code.

5. The method according to claim 1 wherein determining a linearized computational map (100) comprises a single evaluation of the target function.

6. The method according of claim 1 wherein the instructions are configured to process independent instances of vectorised input data using native CPU vectorisation.

7. The method according to claim 3 wherein forming the instructions for the each node is performed prior to performing said steps for a subsequent node of the LCM (100).

8. The method according to claim 1 wherein the instructions comprise memory to register allocation instructions.

9. The method according to claim 8 further comprising forming an auxiliary data structure to define a memory to register allocation.

10. The method according to claim 1 wherein the computer code instructions are written sequentially in memory.

11. The method according to claim 10 wherein the instructions of step (i) are written sequentially from beginning to end.

12. The method according to claim 11 wherein the instructions of step (ii) of claim 1 are written sequentially from end to beginning.

13. The method according to claim 12 wherein the completed sets of instructions formed according to step (i) and step (ii) are concatenated.

14. A computer-readable tangible non-transitory storage medium storing computer program commands configured to program a processor to perform a computer implemented method for operating on a target function to provide computer code instructions configured to implement the target function, the method comprising
defining an active data type;
evaluating the target function using active data type variables;
determining, based on the target function, a linearized computational map (100), LCM, of the target function wherein each node of the LCM (100) comprises an elementary operation;
providing overloaded operators for the elementary operations wherein the output of the overloaded operator enacted on an active data type variable comprises computer code instructions to evaluate the elementary operation of the overloaded operator; and,
hardcoding data which does not depend on a marked user input variable into the computer code instructions output by the overloaded operators.

15. The method according to claim 3 wherein the instructions are written in computer code configured to be executed directly by a CPU.

16. The method according to claim 3 wherein determining a linearized computational map (100) comprises a single evaluation of the target function.

17. The method according to claim 3 wherein the instructions are configured to process independent instances of vectorised input data using native CPU vectorisation.

18. The method according to claim 3 wherein the instructions comprise memory to register allocation instructions.

19. The method according to claim 18 further comprising forming an auxiliary data structure to define a memory to register allocation.

20. The method according to claim 3 wherein the computer code instructions are written sequentially in memory.

* * * * *